US011909093B2

(12) United States Patent
Lockwood et al.

(10) Patent No.: US 11,909,093 B2
(45) Date of Patent: Feb. 20, 2024

(54) WIRELESS ACCESS POINT SUPPORT SPIRE AND DIVIDERS

(71) Applicant: COMPTEK TECHNOLOGIES, LLC, Boulder, CO (US)

(72) Inventors: James D Lockwood, Boulder, CO (US); Dana A Castronova, Wheat Ridge, CO (US)

(73) Assignee: Comptek Technologies LLC, Boulder, CO (US)

( * ) Notice: Subject to any disclaimer, the term of this patent is extended or adjusted under 35 U.S.C. 154(b) by 0 days.

(21) Appl. No.: 17/835,573

(22) Filed: Jun. 8, 2022

(65) Prior Publication Data

US 2023/0058787 A1 Feb. 23, 2023

Related U.S. Application Data

(60) Provisional application No. 63/208,732, filed on Jun. 9, 2021.

(51) Int. Cl.

| | |
|---|---|
| ***H01Q 1/12*** | (2006.01) |
| ***H01Q 1/24*** | (2006.01) |
| ***H01Q 21/28*** | (2006.01) |
| ***H01Q 1/02*** | (2006.01) |
| ***H01Q 1/42*** | (2006.01) |

(52) U.S. Cl.

CPC ............ *H01Q 1/1242* (2013.01); *H01Q 1/02* (2013.01); *H01Q 1/246* (2013.01); *H01Q 1/42* (2013.01); *H01Q 21/28* (2013.01)

(58) Field of Classification Search

CPC ........ H01Q 1/1242; H01Q 1/02; H01Q 1/246; H01Q 1/42; H01Q 21/28; H01Q 1/2291

See application file for complete search history.

(56) References Cited

U.S. PATENT DOCUMENTS

| | | | |
|---|---|---|---|
| 4,224,082 | A | 9/1980 | Jacobson |
| 6,167,673 | B1 | 1/2001 | Fournier |
| 9,698,477 | B1 | 7/2017 | Jabara et al. |
| 10,505,271 | B2 | 12/2019 | Constance et al. |
| 10,763,575 | B2 | 9/2020 | Constance et al. |
| 10,947,751 | B2 | 3/2021 | Lockwood |
| 10,948,143 | B2 | 3/2021 | Lockwood |

(Continued)

FOREIGN PATENT DOCUMENTS

CN 204857960 U * 12/2015 ............... H01Q 1/42

*Primary Examiner* — Hoang V Nguyen

(74) *Attorney, Agent, or Firm* — Russell Manning FisherBroyles, LLP

(57) ABSTRACT

A wireless access point structure including an antenna housing configured to be mounted on top of a pole. The antenna housing may include a plurality of individual antenna bays. The antenna housing can include a plurality of individual antenna bays. In an arrangement, the housing includes an internal spire having an upper and lower end extending between upper and lower ends of the housing. The spire may be a single piece element or a multi-piece element. At least three dividers or panels are connected along the length of the spire (e.g., at selected spaced locations along a length of the spire). Each divider, when connected to the spire, is substantially transverse to the spire. One or more shrouds (e.g., RF transparent sidewalls) extend between and around adjacent panels and/or the upper and lower ends of the housing to define the antenna bays.

19 Claims, 19 Drawing Sheets

(56) References Cited

U.S. PATENT DOCUMENTS

| | | | |
|---|---|---|---|
| 11,121,561 | B2 | 9/2021 | Hoganson |
| 11,201,382 | B2 | 12/2021 | Hoganson |
| 2003/0233806 | A1 | 12/2003 | Ulrich |
| 2004/0070985 | A1 | 4/2004 | Haddad |
| 2009/0040750 | A1 | 2/2009 | Seth |
| 2010/0023146 | A1 | 1/2010 | Hatano et al. |
| 2010/0026604 | A1 | 2/2010 | Caldwell |
| 2010/0231469 | A1 | 9/2010 | Kim |
| 2015/0349399 | A1 | 12/2015 | Lasier et al. |
| 2016/0146438 | A1 | 5/2016 | LaFemina |
| 2017/0030571 | A1 | 2/2017 | Kawahara |
| 2017/0122546 | A1 | 5/2017 | Abbott et al. |
| 2017/0279187 | A1 | 9/2017 | Lockwood |
| 2018/0077324 | A1 | 3/2018 | Adrain |
| 2018/0172229 | A1 | 6/2018 | Lockwood et al. |
| 2018/0219278 | A1 | 8/2018 | Wigdahl et al. |
| 2018/0351245 | A1 | 12/2018 | Constance et al. |
| 2019/0137084 | A1 | 5/2019 | Kim et al. |
| 2020/0118054 | A1 | 4/2020 | Bayges |
| 2020/0136236 | A1* | 4/2020 | Colapietro ......... H01Q 21/0025 |
| 2020/0190842 | A1 | 6/2020 | Ducros et al. |
| 2021/0313666 | A1 | 10/2021 | Hoganson |

* cited by examiner

WIRELESS ACCESS POINT SUPPORT SPIRE AND DIVIDERS

CROSS REFERENCE

The present application claims the benefit of the filing date of U.S. Provisional Application No. 63/208,732, having a filing date of Jun. 9, 2021, the entire contents of which is incorporated herein by reference.

FIELD The present disclosure is broadly directed to a wireless access point or small cell pole configured to provide coverage for local service areas.

BACKGROUND

In wireless communication networks, high-powered base stations (e.g., towers supporting antennas) commonly provide service over large geographic areas. Each base station is capable of serving wireless user devices in a coverage area that is primarily determined by the power of the signals that supported antennas can transmit. Frequently, high-powered base stations (e.g., macro stations) are located in a grid pattern with each base station mounting various antennas elevated on a tower. While such towers have previously provided adequate coverage for wireless applications, such high-powered base stations tend to be too widely spaced for newer high-bandwidth wireless applications.

To improve wireless access, providers are moving toward smaller stations that provide enhanced coverage for more limited geographic areas. That is, to augment the coverage of the wireless network, wireless transceiver devices/antennas (e.g., access points) with relatively small coverage areas (and serving capacities) are deployed. Depending on their coverage area and serving capacities, these wireless transceiver devices are referred to as “femto” cells or “pico” cells. For simplicity and generality, the terms “small cell pole,” “wireless access point” or “access point” are used herein to refer to a wireless transceiver system (e.g., one or more sets of radios/antennas) that are configured to serve wireless user devices over relatively small coverage areas as compared to a high-powered base station that is configured to serve a relatively large coverage area (“macro cell”).

The increasing use of RF bandwidth or ‘mobile data’ has required a corresponding increase in the number of access points to manage the increased data. By way of example, 5G wireless networks providing improved network speeds and are currently being implemented. Such networks typically require shorter RF transmission distances compared to existing networks and thereby require more dense networks of access points. Along these lines, access points are being installed in urban areas to serve several city blocks or even to serve a single city block. Such installations are often below roof-top level of surrounding buildings. That is, access points are being installed at ‘steel-level’ sites typically on small dedicated small cell poles

SUMMARY

A wireless access point structure is provided. The wireless access point structure includes an antenna housing that may be mounted on the top of a pole. The antenna housing may include a plurality of individual antenna bays. In an arrangement, the housing includes an internal spire having an upper and lower end extending between upper and lower ends of the housing. The spire may be a single piece element or a multi-piece element. At least three dividers or panels are connected along the length of the spire (e.g., at selected spaced locations along a length of the spire). Each divider, when connected to the spire is substantially transverse to the spire. One or more shrouds (e.g., RF transparent sidewalls) extend between and around adjacent panels and/or the upper and lower ends of the housing to define the antenna bays.

The dividers may include air passages extending through their peripheral surfaces and opening to their upper and/or lower surfaces. The air passages form airflow inlets and/or outlets for the antenna bays defined above and/or below the antenna bays.

In an arrangement, the spire is hollow to providing a conduit for cabling. In a further arrangement, the hollow interior of the spire is divided to provide two or more conduits or chases. The spire also includes one or more sidewall openings that open into each bay to allow cabling to pass from the interior of the spire into the housing.

In an arrangement, the pole that support the antenna housing is a generally hollow pole that includes a series of openings though its side surface. These openings and an interior of the pole define equipment bays for holding, for example, cellular antenna control equipment. A door is configured to securely cover and expose the openings. In an arrangement, the door utilizes a linkage hinge (e.g., Kinematic hinge). In this arrangement, a rigid linkage pivotally connects on a first end to an interior of the door and on a second end to the pole. When closed, the door may cover both pivotal connections (hinges) providing enhanced tamper proofing. In an further arrangement, baffle plates separate the equipment bays. The baffles may have apertures of varying size to throttle airflow through the pole.

In an arrangement, the access point typically includes two or more stacked antenna housings or bays. Each bay includes an upper end, a lower end spaced from the upper end, and at least one sidewall surface extending between the upper end the lower end to define an enclosed interior area of the bay. Each bay typically includes a plurality of antennas. In an arrangement, the upper end, lower end and one or more partitions between the upper and lower ends, in conjunction with one or more sidewall surfaces, form the antenna bays. In an arrangement, divider panels form partitions and/or the upper and lower ends. Each partition panel includes one or more airflow channels that provide an air inlet and/or outlet for at least one adjacent antenna bay. In an arrangement, ducts connect to the airflow channels to provide cooling for antennas in the antenna bays.

In an arrangement, the antenna housing is generally ovular in cross-section such that a sidewall of the housing has two curved surfaces (e.g., rounded ends) on opposing ends of the housing. The ovular shape of the housing allows a center of curvature of each rounded end to be disposed within an interior of an antenna bay(s)s within the housing. In such an arrangement, the placement of the centers of curvature within the antenna bays allows for pivotally mounting individual antennas at or near the center of curvature. This allows pivoting the antennas within the antenna bay while maintaining a normal vector (e.g., extending normal to an emitting surface of the antenna) nearly perpendicular with an inside surface of shroud surrounding the antenna housing thereby reducing RF reflection and/or scatter. In practice, this may allow for housing two antennas within the housing behind one curved surface and housing a single antenna behind the other curved surface. The use of the two curves surfaces permits, especially in urban canyons, better directing the antennas into the street (e.g., single antenna) and along both directions of a sidewall (e.g., two antennas in second curved surface) while maintaining an active surface of the antennas at acceptable incident angles relative to the interior surface of the sidewall.

In an arrangement, the antenna housing may be configured for attachment to a pole or other support. The housing has an upper surface and a lower surface spaced from the upper surface. At least one sidewall surface extends between the upper surface the lower surface, wherein the upper surface, the lower surface and the sidewall surface at least partially define an enclosed interior area of the housing. Generally, the sidewall extends between peripheries of the upper and lower surfaces. In cross-section the sidewall has a first curved surface on a first end of the housing and a second curved surface on a second end of the housing where first and second side surfaces connect the first and second curved surfaces. The cross-sectional shape of the sidewall has is elongated shape where a length along axis between a first and second ends is greater than a maximum dimension between the side surfaces. As noted, this allows mounting one antenna within the housing proximate to the first curved surface and mounting two within the housing proximate to the second curved surface. The antennas may be pivotally mounted such that they move relative to their curved surfaces while maintaining an nearly perpendicular incident angle with an inside surface of the sidewall.

DETAILED DESCRIPTION

Reference will now be made to the accompanying drawings, which at least assist in illustrating the various pertinent features of the presented inventions. The following description is presented for purposes of illustration and description and is not intended to limit the inventions to the forms disclosed herein. Consequently, variations and modifications commensurate with the following teachings, and skill and knowledge of the relevant art, are within the scope of the presented inventions. The embodiments described herein are further intended to explain the best modes known of practicing the inventions and to enable others skilled in the art to utilize the inventions in such, or other embodiments and with various modifications required by the particular application(s) or use(s) of the presented inventions.

The present disclosure is broadly directed to a wireless access point or small cell pole that is intended for use primarily in urban environments. The access point includes features that are considered novel alone and/or in various combinations with additional features. In various embodiments, the wireless access point houses a plurality of wireless transceivers (e.g., radios and/or antennas). In various arrangements, the access point can support multiple sets of antennas, which may be associated with different wireless providers.

Figure 1A:
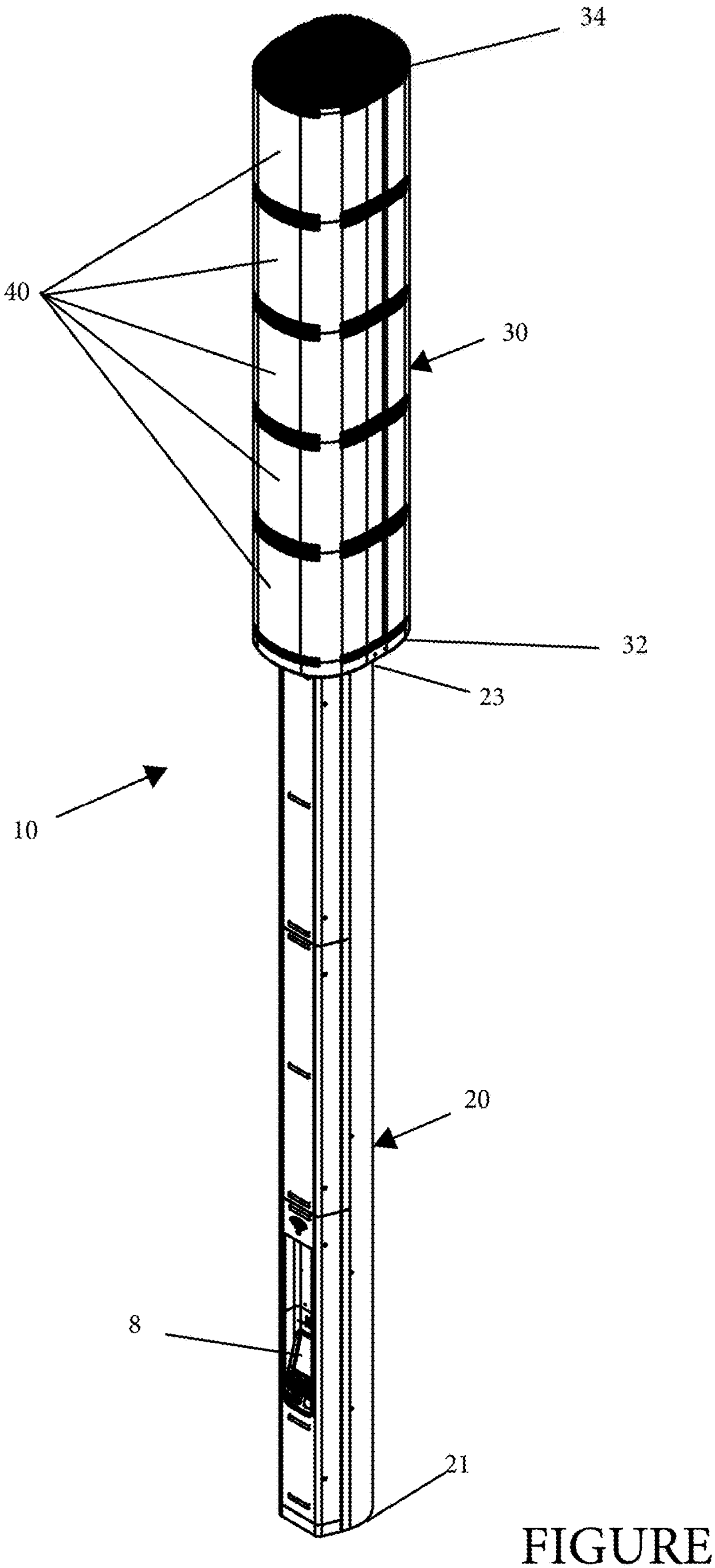
FIG. 1A illustrates one embodiment of a wireless access point.
Figure 1B:
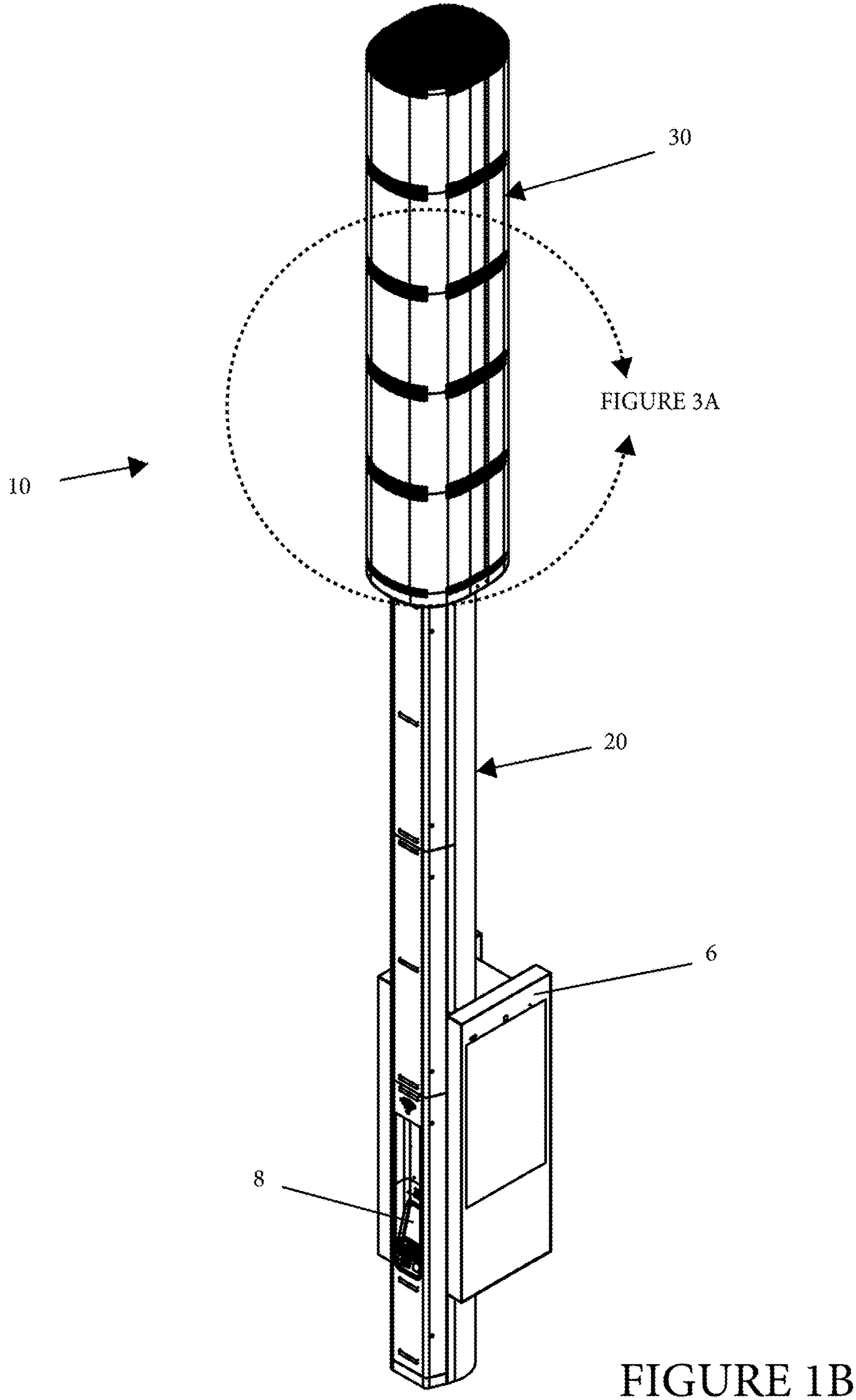
FIG. 1B illustrates another embodiment of a wireless access point.

FIG. 1A illustrates one embodiment of a wireless access point 10 (e.g., small cell pole) having an antenna housing 30 that may include a plurality of individual bays 40 (e.g., antenna bays) as discussed herein. As shown, the access point 10 includes a lower pole section 20 that is generally hollow such that the pole section 20 may house, for example, cell control equipment for wireless antennas/radios in the housing 30. The pole may also provide a passageway for cabling (e.g., power, fiber optics, etc.) from the lower end 21 of the pole section 20 to the upper end 23 of the pole section 20 and into the antenna housing 30. The lower end 21 of the pole section 20 is configured to mount to a surface (e.g., ground surface). Various access panels and/or doors may be mounted to the pole section 20 to enclose equipment within the interior of the pole section. The upper end 23 of the pole section 20 supports the antenna housing 30, which typically includes a plurality of individual antenna bays 40. As illustrated, the antenna housing 30 includes five antenna bays. However, it will be appreciated that the antenna housing 30 may include more or fewer antenna bays 40. Further, while the individual antenna bays 40 are illustrated as having equal sizes (e.g., heights) between a lower end 32 and upper end 34 of the housing 30, it will be appreciated that the individual bays may have differing sizes. In the illustrated embodiment, the wireless access point 10 includes a kiosk 8 that may allow for user interaction, when the access point 10 is located, for example, in a public location or right-of-way (e.g., sidewalk). Such a kiosk 8 may provide various functionality (e.g., directions etc.). FIG. 1B illustrates an alternate embodiment of the access point 10 that includes a display 6. Such a display may provide public announcements, advertising, etc.

Figure 2A:
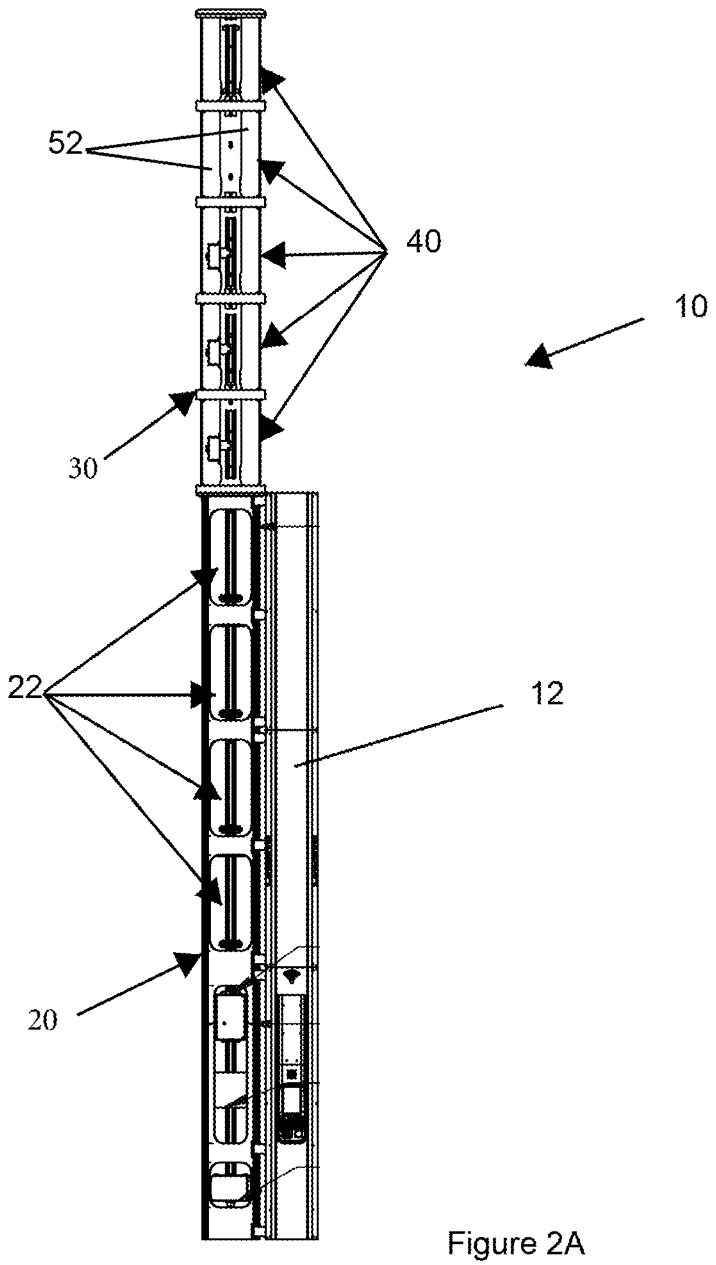
FIGS. 2A and 2B illustrate side view of the wireless access point of FIG. 1A.
Figure 2B:
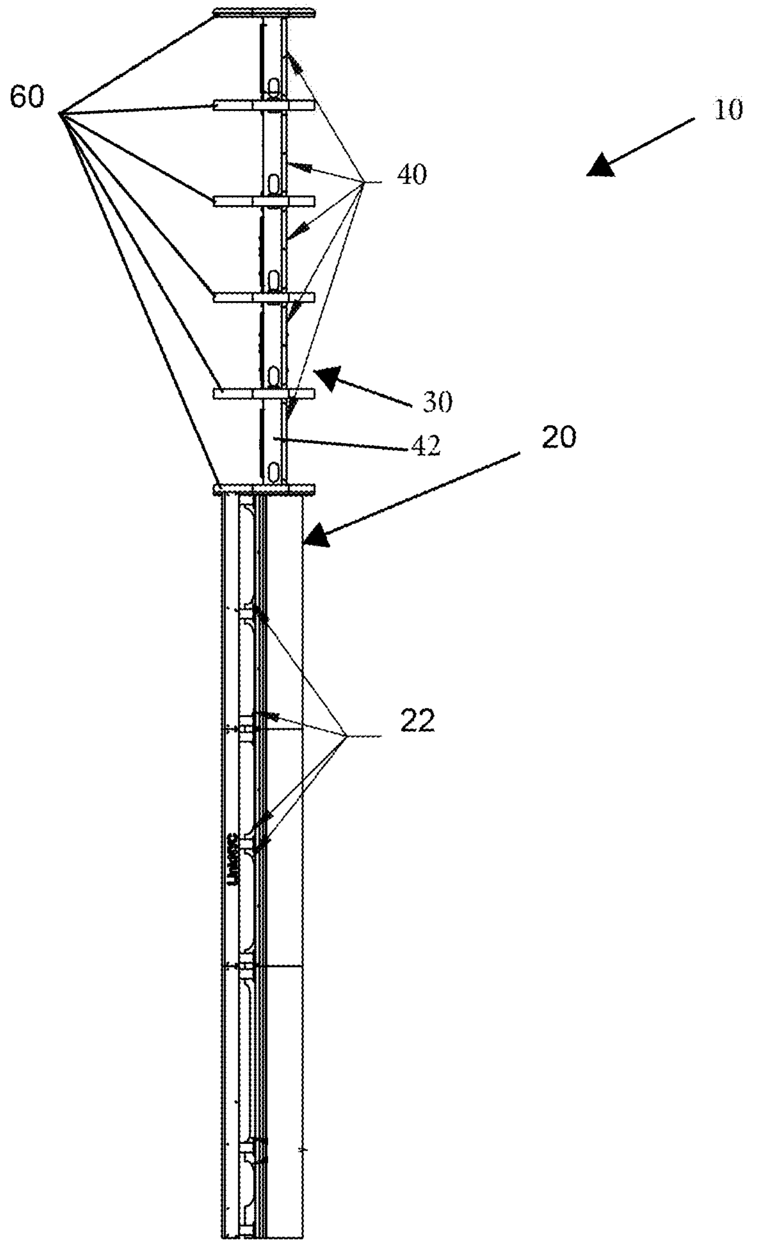
Figure 2C:
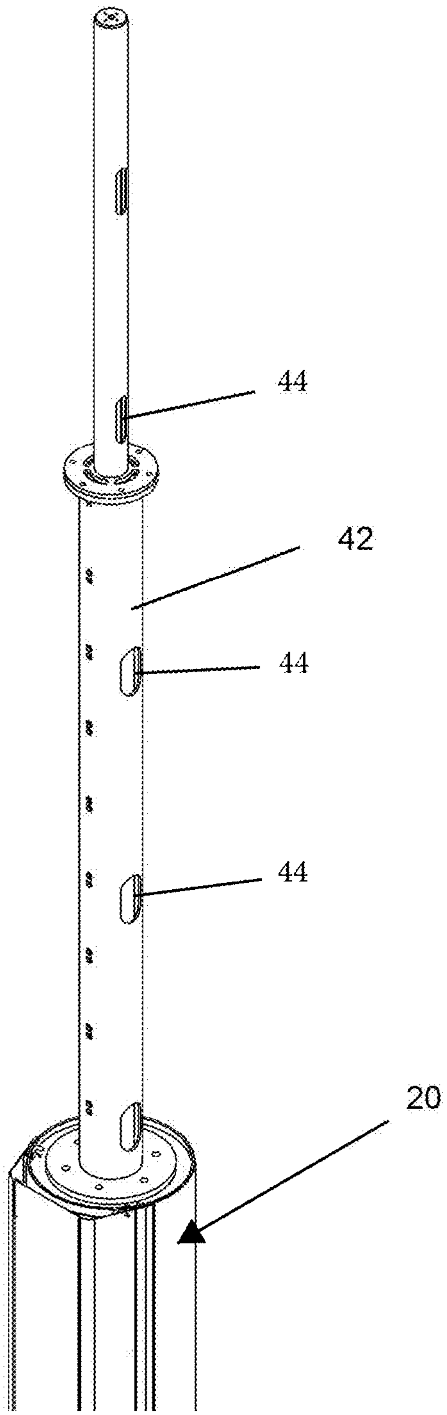
FIG. 2C illustrates an internal support spire of the wireless access point of FIGS. 1A, in an embodiment.

FIGS. 2A-2C variously illustrate an exemplary internal structure of the access point 10. As illustrated in FIG. 2A, an access door 12 covering a front surface of the pole section 20 is open to expose a plurality of individual equipment bays 22. The equipment bays 22 are configured to house, inter alia, cell control equipment for the antenna/radios supported in each of the antenna bays 40. As illustrated in FIG. 2A, shrouding that encloses interiors of the individual antenna bays 40 of the antenna housing is removed exposing various antennas/radios 52 disposed within the bays 40. FIG. 2B illustrates the access point 10 with the antennas/radios 52 removed from the antenna housing 30. As illustrated, the housing 30 of the access point 10 the antenna bays 40 is formed from an interior spire 42 (e.g., antenna housing support pole) connected to the pole section 20 and a plurality of divider panels 60. See also FIG. 2C. The spire 42 may be bolted to the pole section 20 via a flange. However, other attachment means are possible and within the scope of the present disclosure. The spire 42 is an elongated, typically tubular element. The spire 42 may be hollow to permit cabling to pass from the equipment housings 22 in the pole section 20 into the individual antenna bays 40. Along these lines, the spire 42 may include one or more apertures 44 (e.g., through a sidewall of the spire) to provide an access opening for routing cabling into individual antenna bays. Further, the hollow spire 42 and apertures 44 along its length may allow for providing airflow to the interior of the antenna bays. However, this is not a requirement. The spire 42 may also include various dividers within its hollow interior to provide separate cable chases or ducts for wiring the various antennas in different antenna bays. As illustrated in FIG. 2C, the spire 42 may include multiple attached spires having different diameters (e.g., smaller diameters at an upper end). However, this is not a requirement. That is, the spire may be a single piece (e.g., extending between the lower and upper ends 32, 34 of the housing) or the spire may be a multi-piece element having individual pieces with a common diameter. In any arrangement, the spire provides an internal support structure for the antenna housing 30.

To define individual antenna bays 40 of the housing 30, separators or partition panels 60 are connected at various locations along the length of the spire 42. More specifically, two adjacent spaced panels 60 define each antenna bay 40. The panels 60 may be selectively attached to the spire 42 at desired locations to define antenna bays 40 having predetermined heights (e.g., distance between adjacent panels). As illustrated, the panels are evenly spaced. However, this is not a requirement.

Figure 2D:
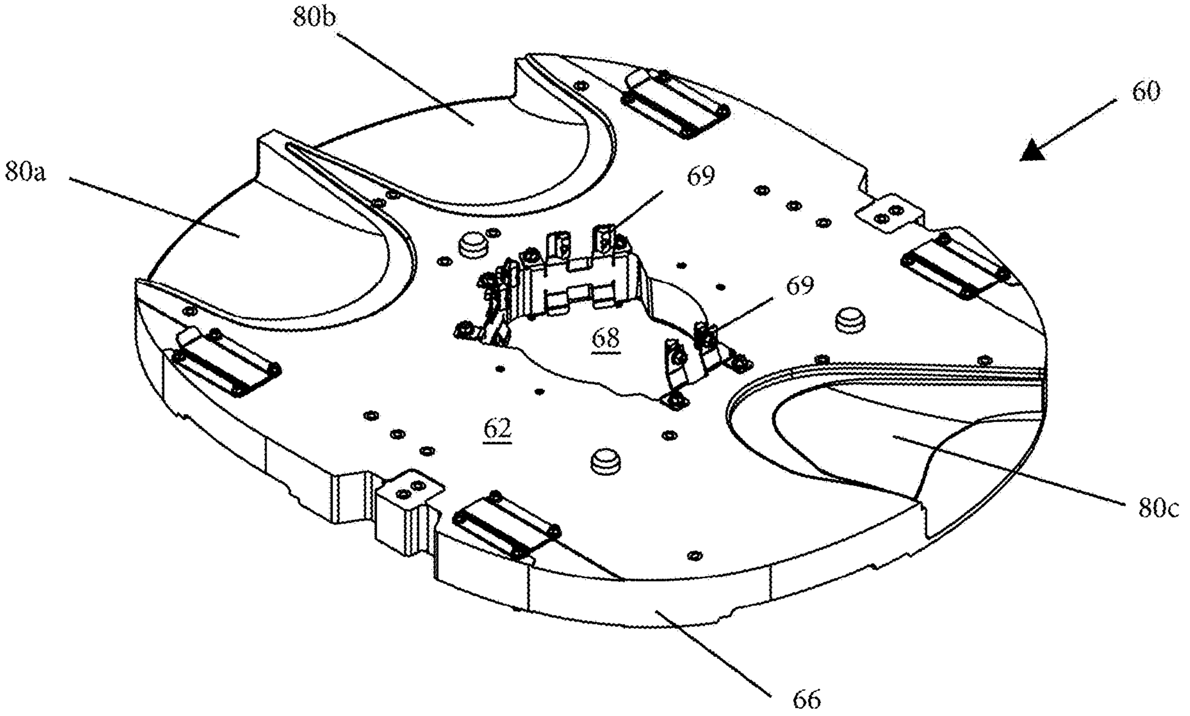
FIGS. 2D and 2E illustrate upper and lower perspective views of a divider panel, in an embodiment.
Figure 2E:
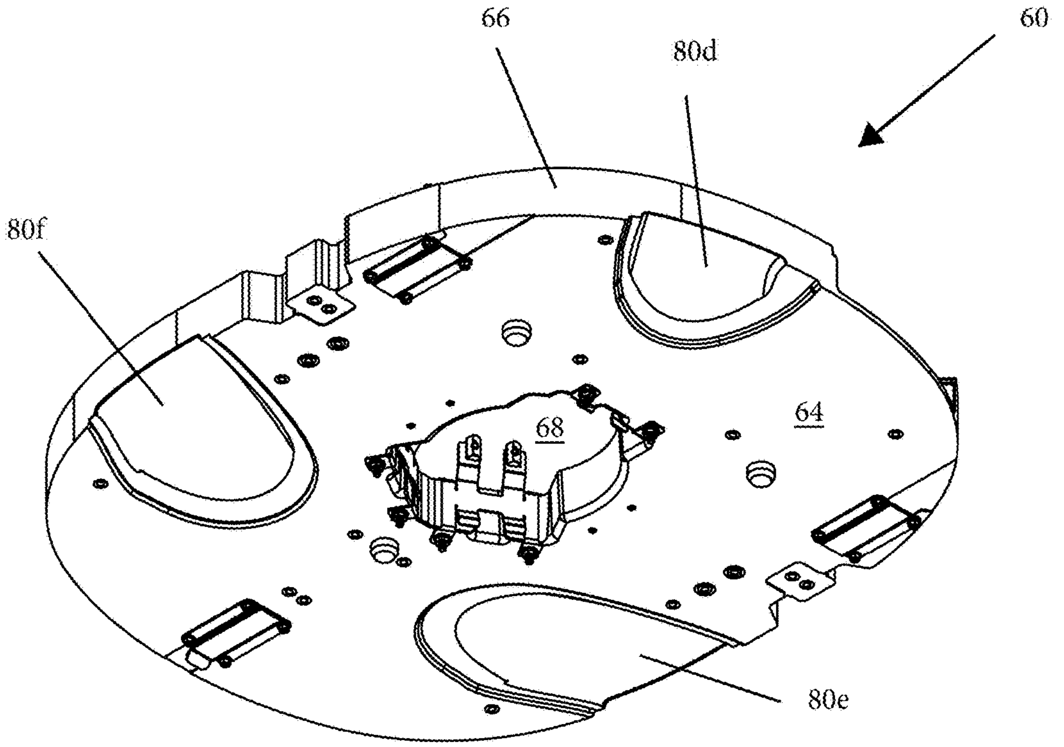

FIGS. 2D and 2E illustrate upper and lower perspective views of one embodiment of a panel 60 configured for connection to the internal spire 42. As illustrated, the panel 60 includes a generally planar upper surface 62 that is spaced from a generally planar lower surface 64. Other surface configurations are possible. A peripheral sidewall 66 extends about a periphery of the panel 60 and extends between the upper and lower surfaces 62, 64. In the illustrated embodiment, the panel 60 includes an internal aperture 68 that is sized to fit around (e.g., receive) the spire 42 during assembly. See, e.g., FIG. 2B. That is, the internal aperture 68 of the panel 60 may pass over an end of the spire 42, the panel 60 may be positioned along a length of the spire to a desired location, and the panel 60 may be attached to the spire 42 via one or more connectors 69 (e.g., brackets, etc.). In the illustrated embodiment, the panel 60 is formed as a single piece requiring that the panel be positioned over an end of the spire 42 during assembly. However, it will be appreciated that the panel 60 may be formed of two or more pieces that may be adjoined to fit about and connect together and/or to the spire. When assembled in an antenna housing, the upper surface 62 of the panel 60 may form a bottom or lower surface of a first antenna bay (e.g., upper antenna bay) while the bottom surface 64 of the panel 60 may form a top or upper surface of a second antenna bay (e.g., lower antenna bay). Alternatively, if the panel 60 forms the upper end of the housing 30 or the lower end of the housing 30, only one of the upper and lower surfaces 62, 64 of the panel 60 will form an end of an antenna housing.

The use of the internal spire 42 in conjunction with the divider panels 60, allows the antenna housing to be modular. That is, the antenna housing may have a single antenna bay utilizing a shorter spire and two divider panels that define upper and lower ends of the housing. Alternatively, three panels and an internal spire of a selected length may define a housing having first and second antenna bays, four panels and an internal spire of a selected length may define a housing having three antenna bays, etc.

Figure 3A:
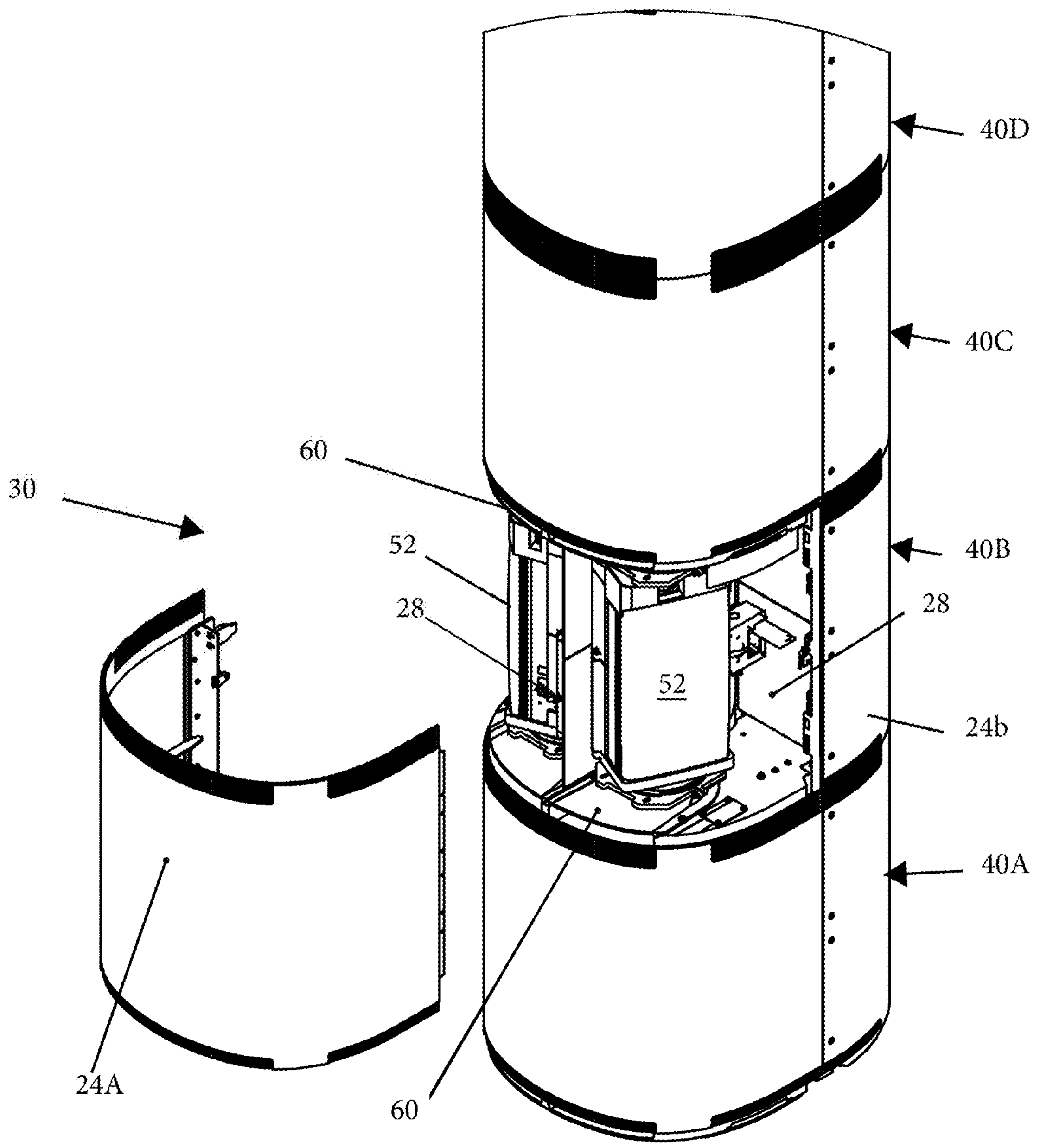
FIG. 3A illustrates a partially exploded view of an antenna housing of FIGS. 1B, in an embodiment.

FIG. 3A illustrates an enlarged portion of the antenna housing 30 as identified in FIG. 1B. In this view, the individual antenna bays are identified as bays 40A, 40B, 40C and 40D. In this embodiment, antenna bay 40A defines a lower bay and bay 40B defines an intermediate bay of the housing 30 while also defining an upper bay relative to lower bay 40A. As illustrated, each antenna bay 40A-D (hereafter 40 unless specifically referenced) is enclosed by two shrouds 24*a*, 24*b*, which extend between and around the peripheries of each pair of adjacent panels to that define each bay. The shrouds 24*a*, 24*b* and adjacent panels 60 collectively define and at least partially enclose an interior of each antenna bay 40. In this regard, the shroud generally defines a sidewall surface of the antenna housing 30. Though illustrated as utilizing two shrouds 24*a*, 24*b* to at least partially enclose each antenna bay 40, it will be appreciated that a single shroud, a pair of shrouds or multi-piece shrouds could be used to enclose multiple antenna bays or individual antenna bays. For instance, a pair of shrouds may extend from the lower end to the upper end of the housing 30 enclosing multiple individual antenna bays. In an embodiment, the shrouds are formed of a RF transparent material that allows a majority (e.g., greater than 90%) of RF energy to be emitted and/or received by antennas/radios disposed within an interior of the antenna bays. In an alternate embodiment, the shroud(s) may include apertures that align with active surfaces of the antennas/radios disposed within the housing.

Figure 3B:
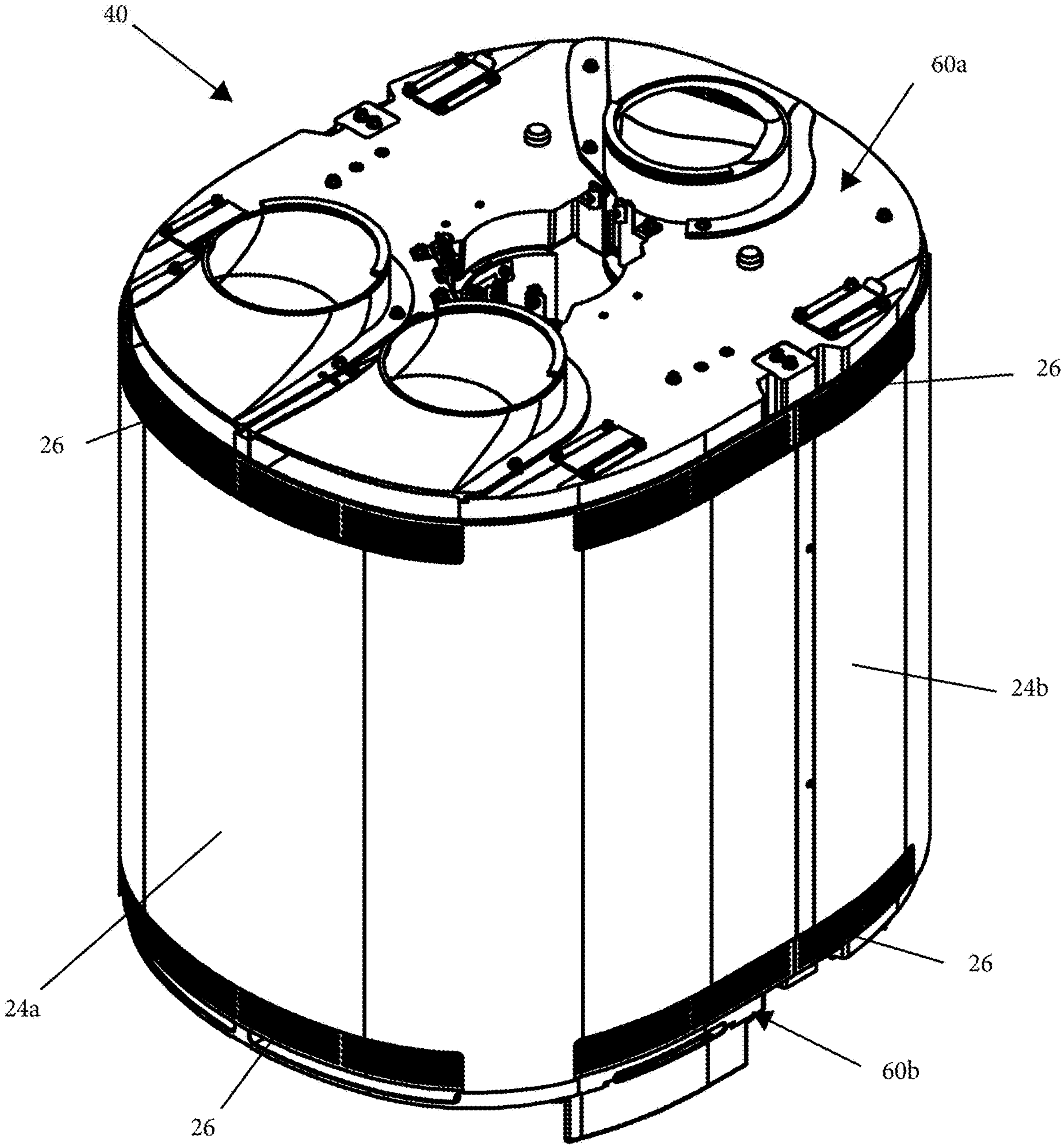
FIG. 3B illustrates a perspective view of an assembled antenna bay, in an embodiment.
Figure 3C:
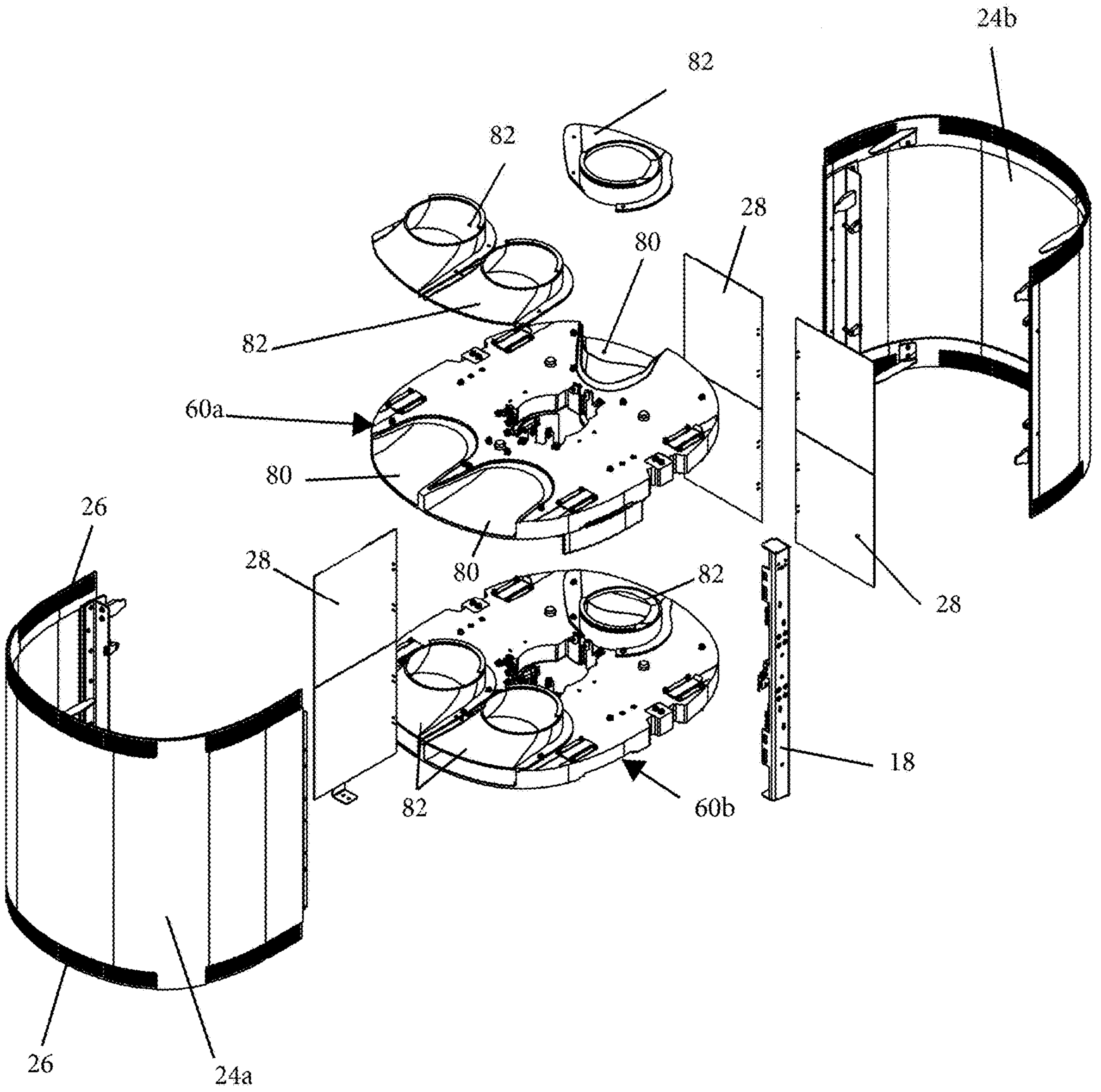
FIG. 3C illustrates an exploded perspective view of a the antenna bay of FIG. 3B, in an embodiment.

FIGS. 3B and 3C illustrate a perspective view and an exploded view of one of the antenna bays 40. As illustrated in these figures, the antennas and internal support spire are removed for purposes of illustration. As shown, the antenna bay 40 is primarily defined by an upper panel 60*a*, a lower panel 60*b* and first and second shrouds 24*a*, 24*b*. The first and second shrouds 24*a*, 24*b* each have an upper edge and a lower that engages about the peripheral edges/sidewalls of the upper and lower panels 60*a*, 60*b*. Each shroud further includes a plurality of apertures or vents 26 disposed proximate to the upper and lower edges of the shroud. When assembled, the vent apertures may at least partially align with the peripheral sidewall 66 of the panels 60. See also FIGS. 2D and 2E. These vents 26 allow for airflow into and out of an interior of the antenna housing. In an embodiment, the vents 26 allow airflow to pass into air passages or ducts formed at least partially within in the peripheral sidewalls 66 of the panels 60, as is further discussed below. In the illustrated embodiment, three dividers 28 are positioned within the interior of the antenna housing 40, which in this embodiment is configured to hold three wireless antennas/radios. The dividers 28 separate the interior of the antenna bay 40 into three separate sections (See, e.g., FIG. 3A) In this regard, each divider 28 may extend between an inside surface of one of the shrouds 24*a* or 24*b* to the internal spire (not shown) and between a bottom surface of the upper panel 60*a* and a top surface of the lower panel 60*b*. The dividers 28 help minimize heat transfer between different antennas. The antenna bay may further include one or more side supports or support straps 18 (only one shown) that may extend between peripheral edges of the panels. It will be appreciated that when an antenna housing includes multiple bays, the support straps may extend between peripheral edges of multiple panels across multiple antenna bays.

Figure 3D:
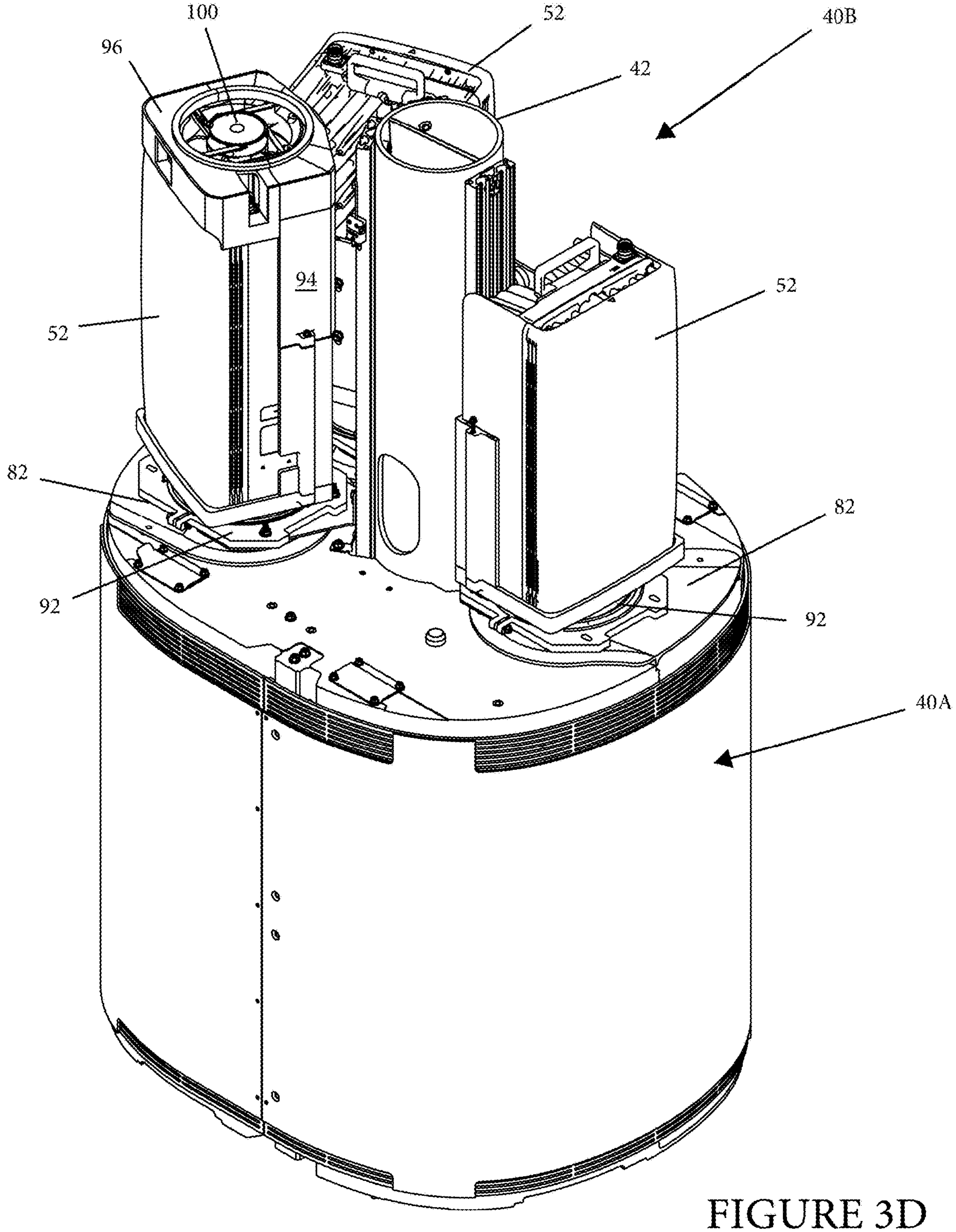
FIG. 3D illustrates first and second antenna bays of the antenna housings of FIG. 3A, in an embodiment.

FIG. 3D illustrates the upper antenna bay 40B disposed above the lower antenna bay 40A with the shrouds, the upper panel and the internal divider removed from the upper antenna bay 40D for purposes of illustration. As illustrated, the antenna bay 40B houses three antennas 52 within the interior of the antenna bay 40B. In the illustrated embodiment, the 5G antennas/radios 52 are similar to the Streetmacro 6701 antennas produced by Ericsson. It will be appreciated that the wireless access point and antenna bays disclosed herein may be utilized with a variety of radios/antennas and that this 5G radio is presented by way of example only. Nonetheless, the Streetmarco antenna unit is representative of a general form of a number of 5G antenna units currently being installed. As illustrated, the radios 52 include a generally rectangular prism-shaped housing having a front panel or radome, which is a thin-walled RF transparent area that protects the forward emitting surface of an RF antenna (not shown). The illustrated radios may also include an internal cooling duct that passes through the rearward portion of the radio housing from an inlet (not shown) in the bottom surface to an outlet in the top surface. The cooling duct passes over a heat rejection surface disposed within the interior of the radio 52. The heat rejection surface may be a finned surface (e.g., aluminum) attached to a rearward surface of the RF antenna. Commonly, the radio will include a fan (not shown) disposed within the radio housing to move air through the cooling duct from the inlet to the outlet. The air passing through the duct passes over the heat rejection surface thereby cooling the antenna. As is further discussed herein, the antennas may be connected to ducting such that cooling air is drawn over/through the individual antennas from an exterior of the antenna bay and expelled to the exterior of the antenna bay.

As noted above, each panel 60 forms a structure with spaced upper and lower surfaces 62, 64 (e.g., polymer, sheet metal etc.) connected by a peripheral sidewall 66. The interior of the panel may include various bracing to provide necessary structural rigidity. Alternatively, the panel may include insulation (e.g., foam) within its interior to prevent heat passing between adjacent antenna bays. In such an embodiment, the upper and lower surfaces may be printed, injection molded polymer and/or composite surfaces.

When supporting multiple antennas, a wireless access point may generate significant heat within the housing, and it is often desirable to remove such heat from the antennas or the housing. Along these lines, in various embodiments, the panel(s) provide a location for introducing and exhausting air from the interior of the antenna bays. More specifically. The panels 60 illustrated in FIGS. 2D, 2E and 3C include a plurality of airflow passages 80*a-c* and 8*d-f* (hereafter 80 unless specifically referenced), which are utilized to provide airflow to or from adjacent antenna bays. However, it will be appreciated that in other embodiments, the panels may omit the airflow passageways 80.

Figure 3E:
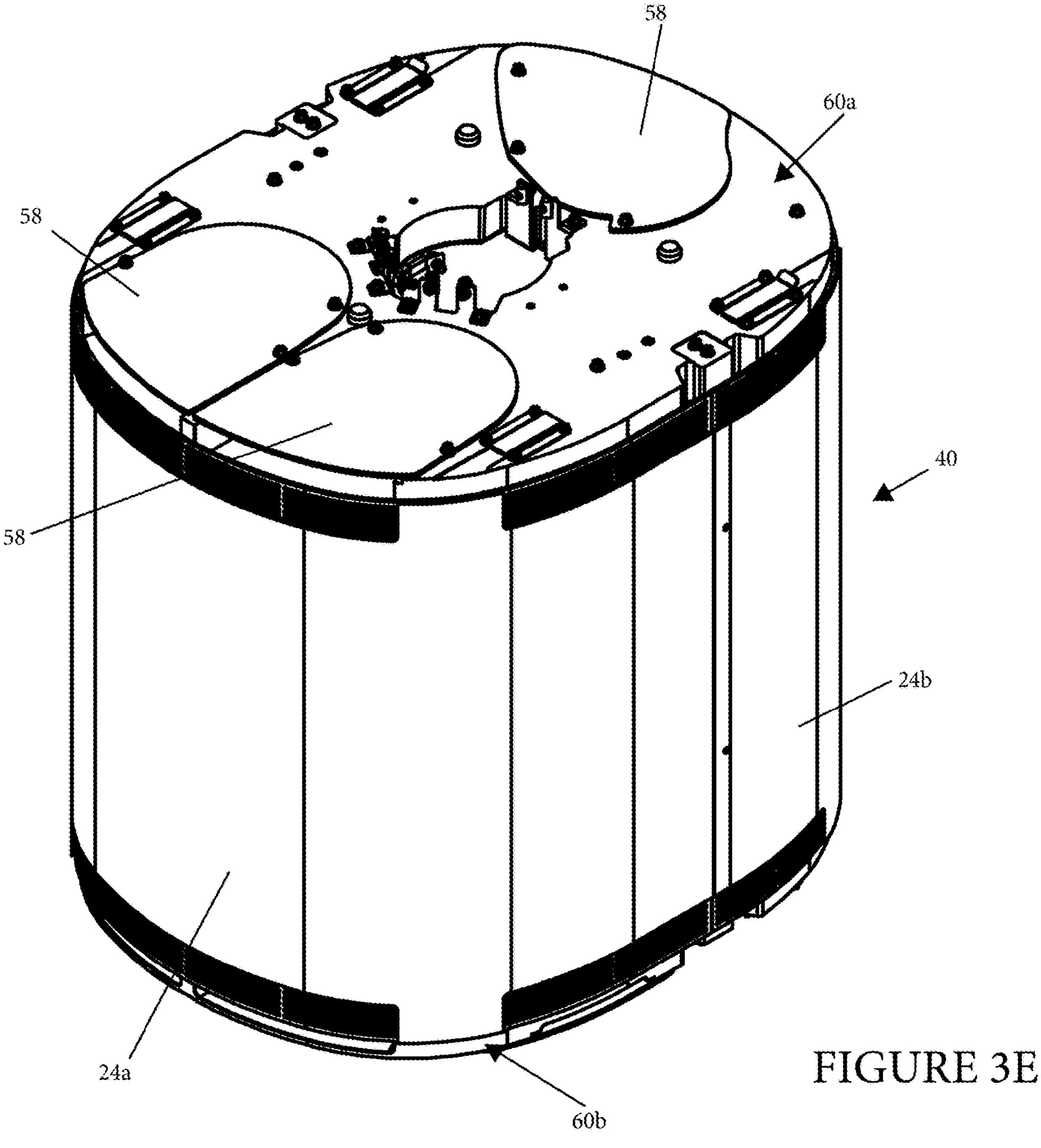
FIG. 3E illustrates a perspective view of an assembled antenna bay, in another embodiment.

As illustrated in FIGS. 2D and 2E, each panel 60 includes three airflow passages 80*a-c* formed in its upper surface 62 and three airflow passages 80*d-f* formed in its lower surface 64. In the illustrated embodiment, each airflow passage 80 is a channel that is recessed below the upper or lower surface of the panel 60 and which extends through the peripheral sidewall 66. In this regard, each airflow passage 80 includes a first portion or end that opens through the sidewall 66 of the panel 60 and a second portion or end that opens through the upper or lower surface of the panel. Though illustrated as recessed channels, it will be appreciated that the airflow passages could be formed as ducts that are partially enclosed within the panel (e.g., having a sidewall that extends between two open ends). Further, in instances where a panel includes airflow passages on its upper and lower surfaces, the panel may be used to introduce and/or exhaust air from two adjacent antenna bays. That is, airflow passages in the upper surface of the panel may open into an upper antenna bay (e.g., forming air inlets into the upper bay) and airflow passages in the lower surface of the panel may open into a lower antenna bay (e.g., forming air outlets out of the lower bay). Such a panel may be termed a bi-directional panel. Though illustrated as having three sets of bi-directional airflow passages (i.e., passages on both the upper and lower surfaces of the panel), it will be appreciated that the number and location of the bi-directional ducts may be varied. Further, inlets and outlets of the airflow channels opening through the sidewall of the panel may be staggered about the periphery of the sidewall to prevent inlets used for an upper antenna bay from drawing in air exhausted from outlets used for a lower antenna bay. In other embodiments, only the upper or lower surface of a panel may include air passages. Such a panel may be termed a unidirectional panel. Such unidirectional panels may be utilized when a panel forms an upper end or lower end of an antenna housing, and the panel provides only airflow inlet(s) or airflow outlet(s) for a single antenna bay. However, a bi-directional panel may be used in such embodiments where the upper or lower airflow passages are capped with plates 58 effectively forming a unidirectional panel. See FIG. 3E. Such an arrangement allows for utilizing a common divider panel for end panels that provide airflow to a single antenna bay as well as intermediate panels that provide airflow to two adjacent antenna bays.

When two panels 60*a*, 60*b* are used to form an antenna bay, the panels at least partially define plenums for use in inletting and exhausting into and out of the antenna bays and, in an embodiment, passing air over or through the individual antennas/radios within the antenna bay. To provide enhanced cooling for the antenna bay, the illustrated embodiment utilizes closed air flow paths that individually cool (i.e., pass over and/or through) each of the antennas/radios disposed within the antenna bay. In this regard, each antenna/radio may be disposed in an individual air flow path (e.g., substantially sealed air flow path) that enters the antenna bay through an airflow passage in a first panel (e.g., lower panel 60*b*), passes over or through the radio (e.g., over a heat rejection surface of the radio) and is exhausted out of the bay via an airflow passage in a second panel (e.g., upper panel 60*a*). In such an arrangement, the lower panel 60*b* defines a lower plenum (e.g., intake manifold) and the upper panel 60*a* defines an upper plenum (e.g., exhaust manifold). See FIGS. 3C and 4.

In the illustrated embodiment, the lower panel 60*b* includes three airflow passages 80 formed in its upper surface and extending through its peripheral sidewall. The airflow passages 80 formed in the upper surface of the lower panel may be fitted with air duct inserts 82 that each cover the portion the recessed channel recessed into the upper surface of the panel while leaving open the end of the recessed channel extending through the peripheral sidewall of the lower panel 60*b*. The lower panel air ducts inserts 82 may terminate in an annular collar, which may be fit to additional ducting. Likewise, a bottom surface of the upper panel 60*a* includes three air passages formed in its lower surface and extending through is peripheral sidewall. The air passages 80 on the lower surface of the upper panel may also be fitted with air duct inserts (not shown) that cover a portion of the recessed channel while leaving the open the end of the recessed channel open through the peripheral sidewall of the upper panel. The upper panel air duct inserts may terminate in an annular collar, which may be fit to additional ducting.

Figure 4:
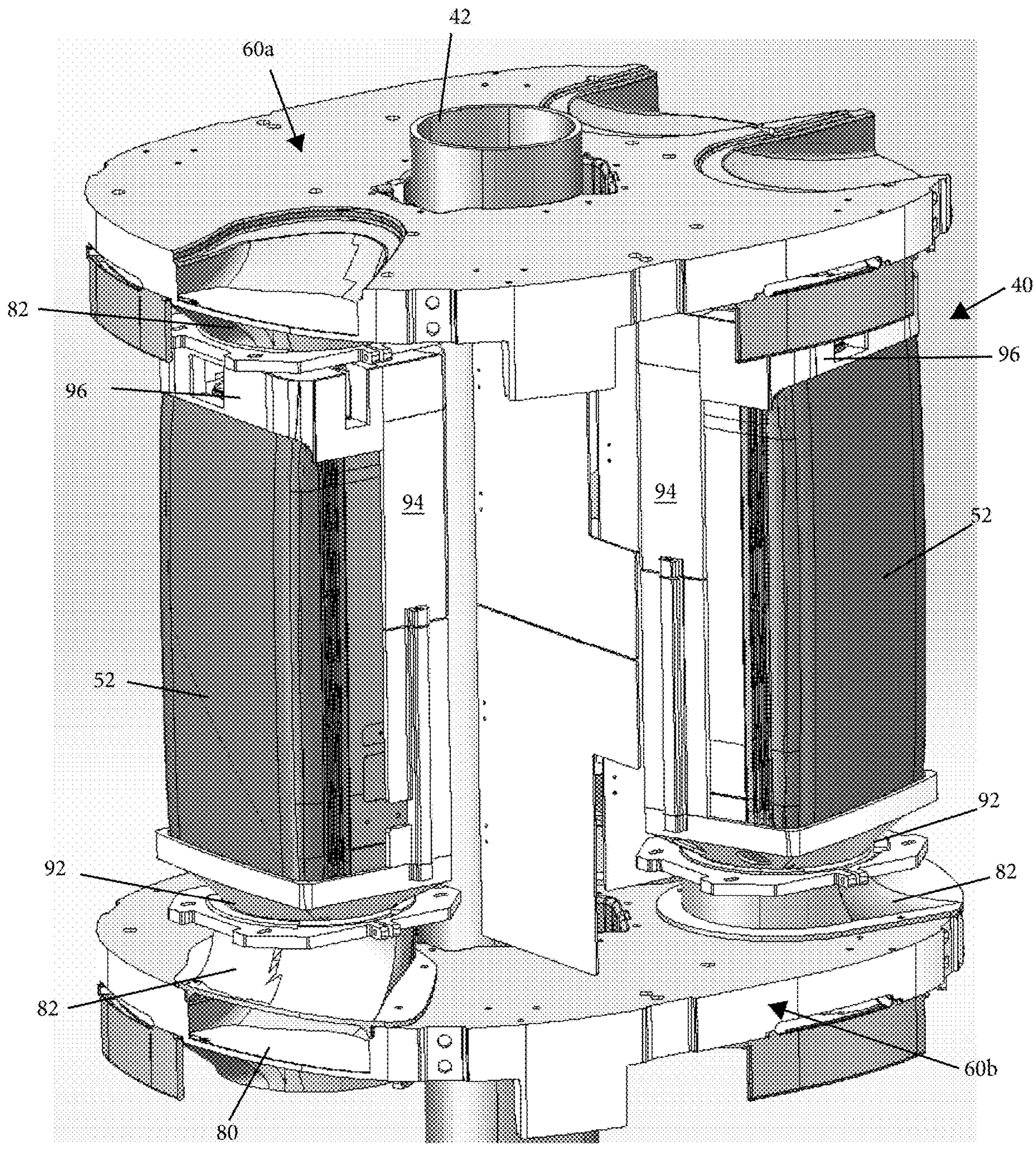
FIG. 4 illustrates internal components of an antenna bay, in an embodiment.

The duct inserts 82 may be individually formed (e.g., 3-D printed) and connected to their respective panel. In the illustrated embodiment, a lower end of each duct insert engages the upper or lower surface of the panel about the edges of the recessed channels forming the air passages. Once assembled to the panels, a first open end of each duct 82 extends through the sidewall between the upper and lower surfaces of its panel. A second open end of each duct terminates in a collar that may be fit with additional ducting. This is best illustrated in FIG. 4, which illustrates two radios 52, connected between a lower panel 60*b* and an upper panel 60*a* of an antenna bay 40. Various components of the antenna bay 40 are omitted for clarity. As illustrated, each radio 52 connects to the air passages in the panels 60*a*, 60*b* via a set of ducting. The set of ducting may include an inlet duct 92 that extends between the radio 52 and the collar of the duct insert 82 of the lower panel 60*b*, an intermediate duct 94 that fits over or receives the rearward side (e.g., heat rejecting surface) of the radio 52 or an intermediate duct that extends through an interior of the radio, and an outlet duct 96 that extends between the radio 52 and the collar of the duct insert 82 of the upper panel 60*a*. The various ducting may be designed to fit to specific radios. In some embodiments, the radios 52 include an internal fan that displaces air through the interior of the radio. In such embodiments, operation of the fan within the antenna/radio 52 draws air into the antenna bay 40 through the sidewall opening of an air passage in the lower panel 60*b*, into the inlet duct 92, through the intermediate duct 94 and over a heat rejecting surface of the antenna/radio, through the outlet duct 96 and expels air out of the antenna bay through the sidewall opening of the air passage in the upper panel 60*a*. In this regard, the air passages and ducting provide airflow pathways between the exterior of the antenna bay 40, through or over the radios and out of the antenna bay 40 thereby preventing heat build-up within the antenna bay. Similar ducts for use in connecting a wireless radio to inlet and outlet vents are set forth in co-owned U.S. Pat. No. 11,201,382, which issued on Dec. 14, 2021, 2020, the entire contents of which is incorporated herein by reference. The connecting ducts, in conjunction with the panel airflow passages in the panel, allow the radios 52 to be cooled by passing air through the antenna bay without intermingling the cooling airflow or subsequently heated air with air in the interior of the bay.

Figure 5A:
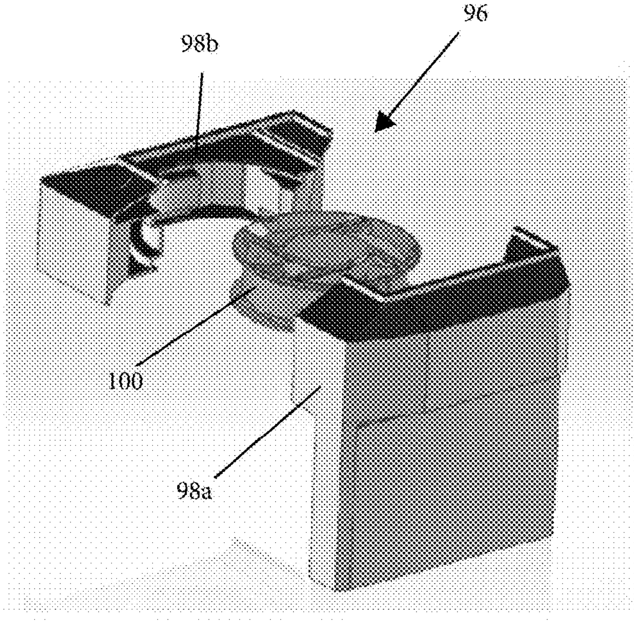
FIGS. 5A and 5B illustrate an outlet duct, in an embodiment.
Figure 5B:
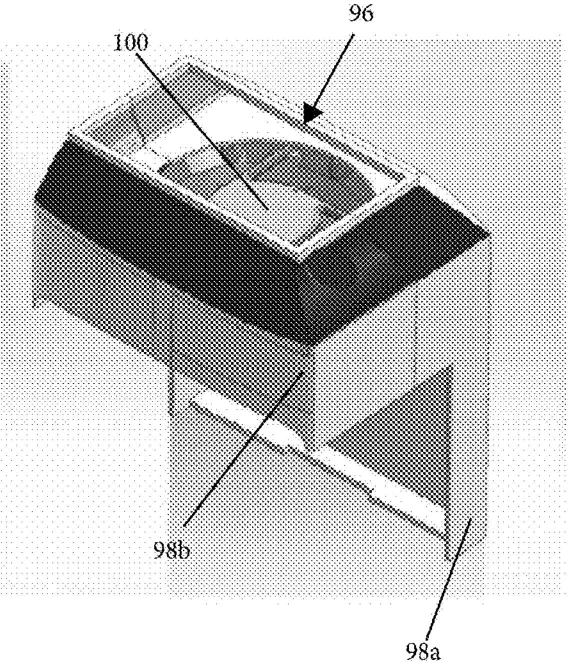

As previously noted, the panels 60*a*, 60*b* may be utilized with antennas/radios having an internal fan disposed within the radio housing. In such an arrangement, the intermediate duct 94 may be integrally formed by the radio. Radios having an integrated duct and cooling fan may be termed actively or forced cooled radios. It will be appreciated that numerous antenna/radios are passively cooled. That is, the radios have a heat rejection surface, typically on a rearward surface opposite of the radome but do not include an integrated fan to provide airflow/cooling. FIGS. 5A and 5B illustrate an embodiment of an outlet duct 96 configured for connection to a passive radio to provide forced cooling for such a passively cooled radio. As shown, the outlet duct has first and second mating pieces 98*a*, 98*b* that mate about the periphery of a fan 100. The outlet duct 96 is configured to engage an upper end of a passively cooled radio and an intermediate duct 94 that covers the rearward surface of such a radio. This is best illustrated in FIGS. 3D and 4. In such an embodiment, the rearward surface of each radio 52, may be received within the intermediate duct 94 which forms a vertical plenum that provides an airflow passageway over the rear heat rejecting surface of the radio 52. The outlet duct 96 may be connected to the airflow passage of an upper panel (not shown). Once assembled, the fan 100 disposed within the outlet duct 96 can provide forced cooling for the radio/antenna. Though illustrated as an outlet duct incorporating the fan 100, it will be appreciated that the inlet duct could additionally or alternatively incorporate a fan to provide forced airflow.

Figure 6A:
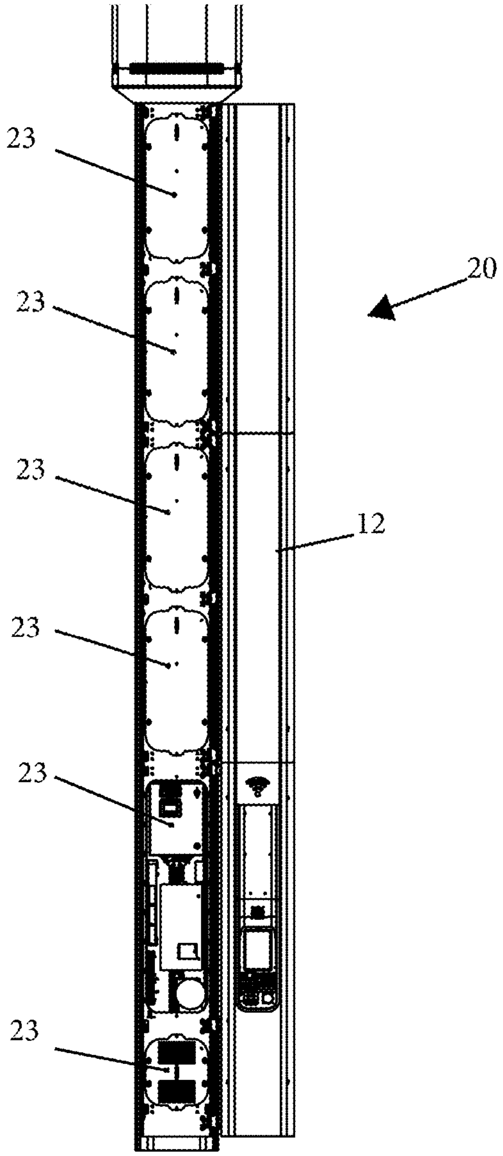
FIGS. 6A and 6B illustrate a pole section of the wireless access point of FIGS. 1A, in an embodiment.
Figure 6B:
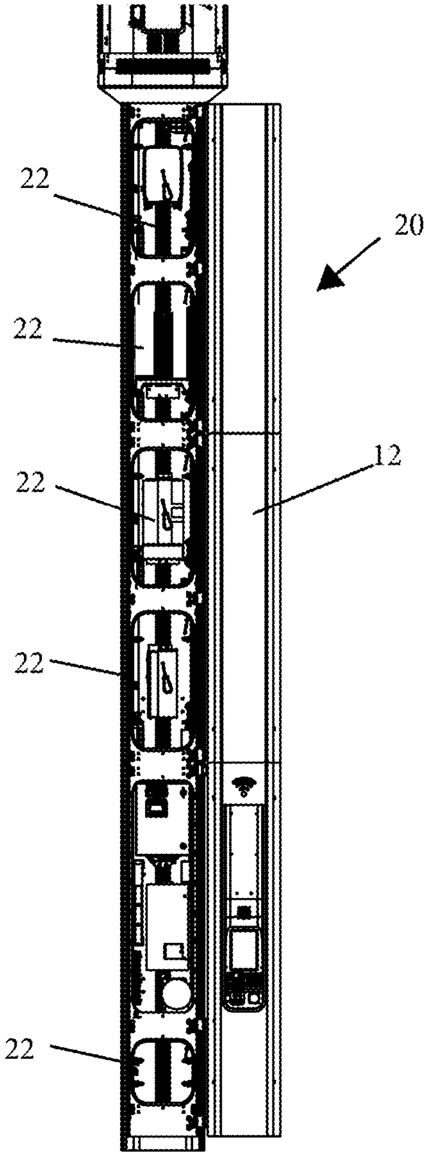

FIGS. 6A and 6B illustrate the pole section 20 of the wireless access point 10. Generally, the pole is an elongated structure having a hollow interior. In order to utilize a location of a wireless access point more effectively, the hollow interior of the pole section 20 may house equipment, for example, associated with the wireless antennas/radios supported in the antenna housing. In the illustrated embodiment, the support pole has a circular cross-section. However, it will be appreciated that the pole section may have other cross-sectional shapes (e.g., tubular shapes) and the presented embodiments are provided by way of example and not by way of limitation. As illustrated in FIGS. 6A and 6B, an access door 12 that covers a front surface of the pole section 20 is opened to expose a plurality of individual equipment bays 22. The equipment bays 22 are configured to house, inter alia, cell control equipment for the antenna/radios supported in each of the antenna bays 40. In the illustrated embodiment, the individual equipment bays 22 are formed as apertures in the sidewall of the tubular pole.

Figure 6C:
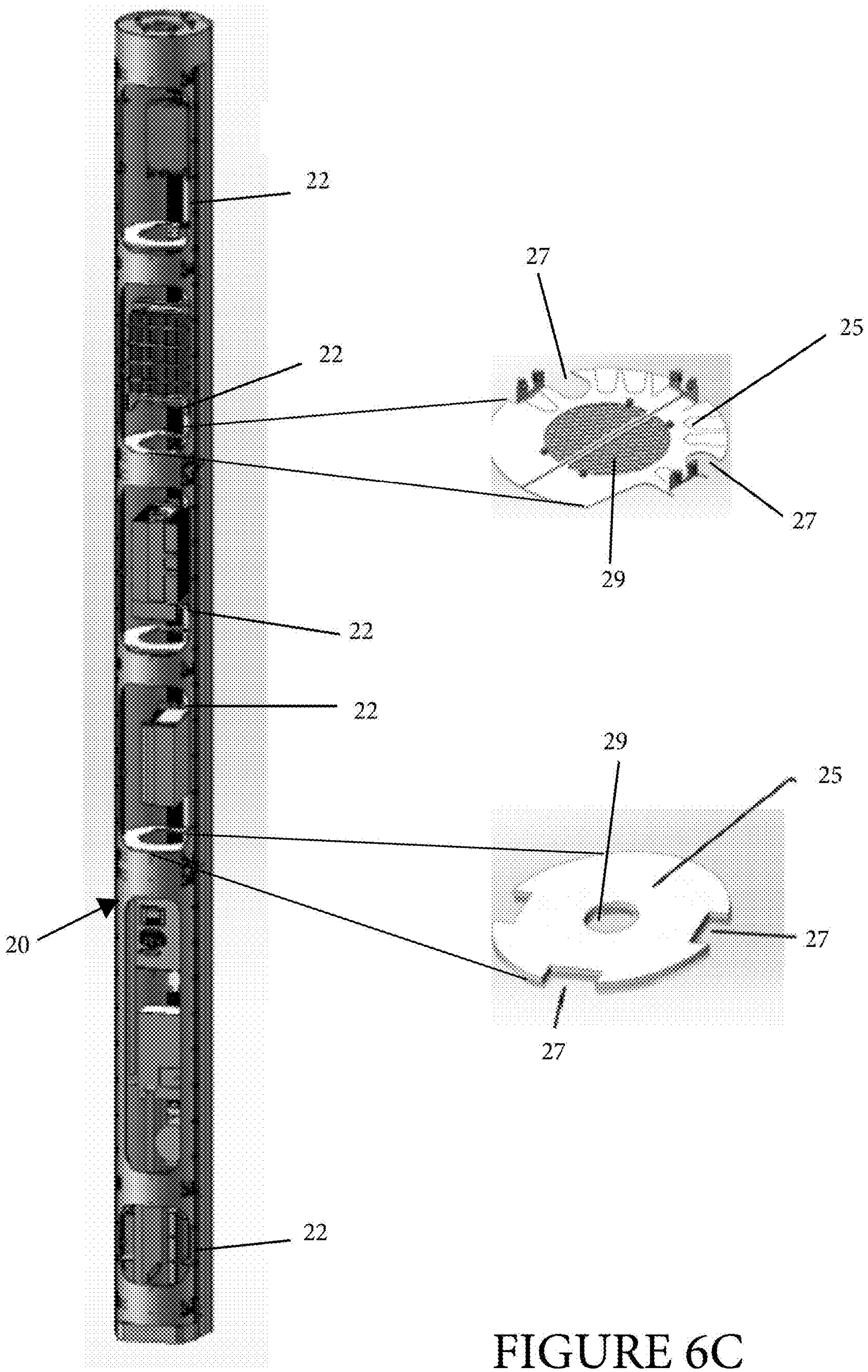
FIGS. 6C illustrates internal components of the pole section of FIGS. 6A and 6B, in an embodiment.

In an embodiment, each antenna bay of the antenna housing has a dedicated equipment bay 22 in the pole section 20 of the access point. While not a requirement to match the number of equipment bays with the number of antenna housings, in use the multiple antenna bays in the housing will typically house antennas/radios associated with different wireless carriers. Accordingly, it may be desirable to limit access to the individual antenna bays in the antenna housing and the individual equipment bays 22 in the pole section 20. For instance, the shrouds may lock in position relative to each antenna bay to provide individual access to each antenna bay (e.g., keyed access). Further, the divider panels may prevent access between the interior of the antenna bays. Likewise, it may be desirable to limit access to the individual equipment bays 22. As illustrated in FIG. 6A, each of the equipment bays has a cover 23 that fits over the opening in the pole section defining the equipment bay 22. These covers 23 may be locked to the pole utilizing keys or specialized fasteners. The covers 23 may be disposed below the common access door 12 when the access door is closed. To further limit access between the interior of the equipment bays 22, baffle plates 25 may be disposed within an interior of the pole section 20 between the equipment bays 22 as illustrated in FIG. 6C.

The baffle plates 23 limit or prevent access between adjacent equipment bays. However, the baffle plates include various openings 27 about their outer peripheries that allow routing cabling through the interior of the pole section to the antenna housing. Further, the baffle plates 23 may include interior apertures 29 to allow air flow through the interior of the pole section 20. Similar to the antennas in the housing, equipment in the equipment bays generate heat during operation. Further, solar loading (e.g., solar irradiance on the pole section) can result in elevated temperatures within the interior of the pole section. To reduce temperatures in the pole, a fan (not shown) may be incorporated within the pole, typically near the top or bottom of the pole. The fan may push or draw air through the interior of the pole section 20. To throttle the movement of air through the pole section, the size of the internal apertures 29 may vary between baffle plates 23. For instance, lower baffle plates may have smaller internal apertures 29 while upper baffle plates have larger internal apertures 29. To further prevent access between the equipment bays, the internal apertures may incorporate screens as shown in FIG. 6C. Further, the baffle plates may be made as single piece elements of multiple piece elements.

Figure 7A:
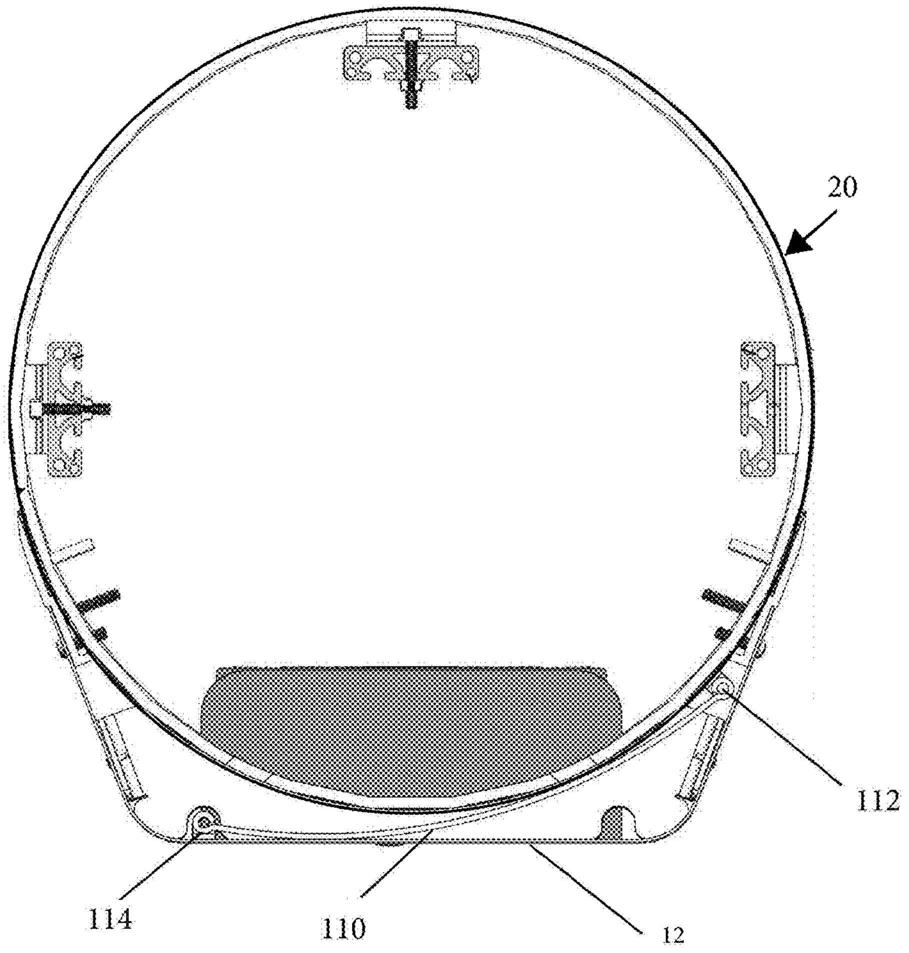
FIGS. 7A and 7B illustrate an access door of the pole section, in an embodiment.
Figure 7B:
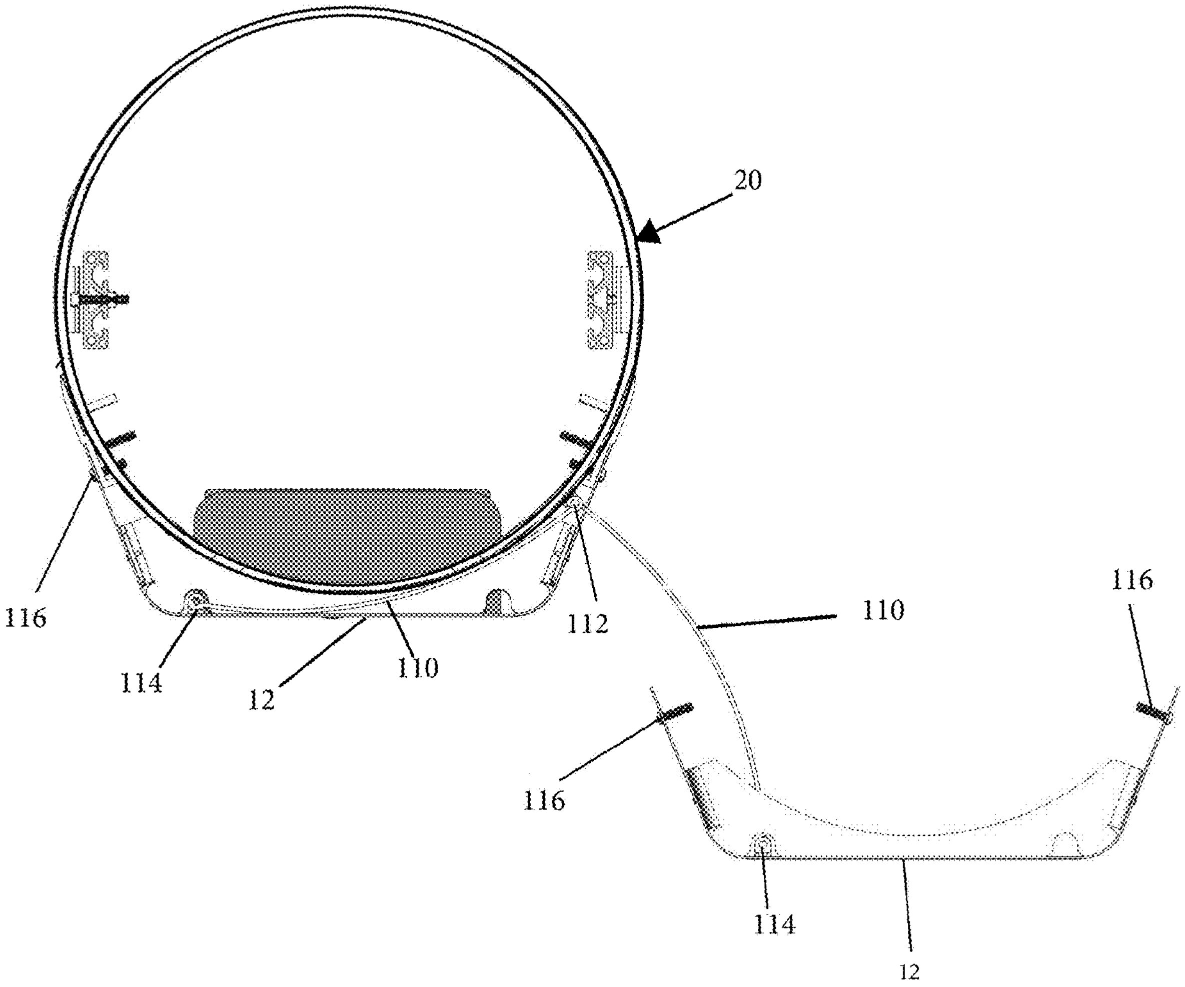

FIGS. 6A and 6B illustrate the pole section 20 with the single access door 12 that opens to expose all of the individual equipment bays 22. Stated otherwise, the access door 12 covers all of the equipment bays 22 when closed. However, it will be appreciated that individual access doors may be utilized to cover individual equipment bays 12. FIGS. 7A and 7B illustrate the movement of the access door 12 from a closed position (FIG. 7A) to an open position (FIG. 7B). FIG. 7B illustrated the door 12 in both the open and closed positions for purposes of illustration. In the illustrated embodiment, the access door 12 is generally U-shaped in cross-section. That is, the interior of the door is concave. An interior surface of the U-shaped door extends over the openings in the sidewall of the pole section 20, which define the individual equipment bays 22. The side-walls of the U-shaped door are configured to engage the sidewall of the pole section 20 on either side of the equipment bay openings. When closed, the door prevents access to the equipment bays.

To allow better access to the equipment bays as well as provide anti-tampering safety, the door 12 utilizes a kinematic hinge arrangement. In this regard, the door 12 connects to the pole section 20 via rigid linkages 110 along the length of the door (only one shown in the cross-sectional views of FIGS. 7A and 7B). A first end of the linkage 110 is pivotally connected via a first hinge 112 to the sidewall of the pole section 20. A second end of the linkage 110 is pivotally connected via a second hinge 114 to an interior surface of the U-shaped door. As illustrated, the kinematic hinge arrangement allows for positioning the door 12 entirely away from the pole section 20 to provide improved access to the equipment bays. Further, both hinges 112, 114 are positioned behind an interior surface of the door 12 when the door is closed. Such positioning prevents tampering with the hinges to gain access to the interior of the equipment bays. Additionally, the sidewalls of the U-shaped door may be bolted to the sidewall of the pole section with anti-tampering bolts to further secure the door.

Figure 8A:
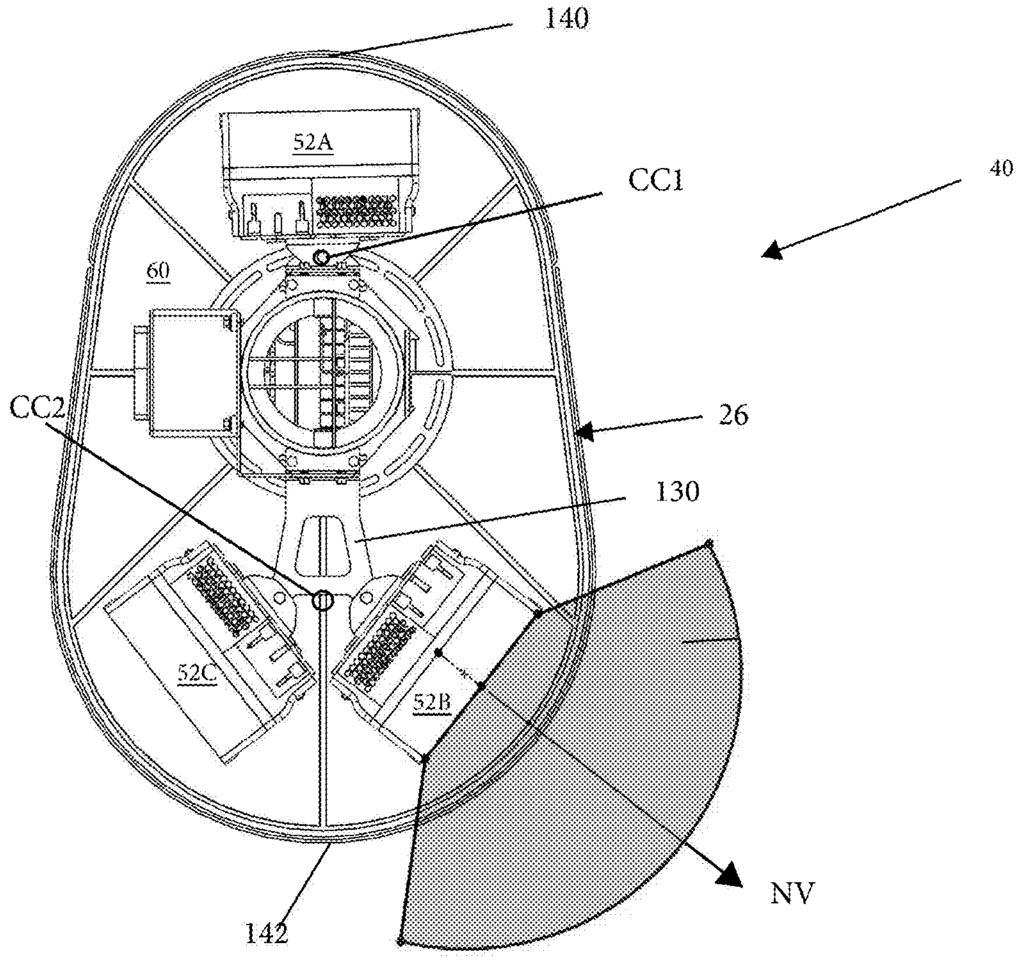
FIGS. 8A and 8B illustrate an top view of an antenna housing, in an embodiment.
Figure 8B:
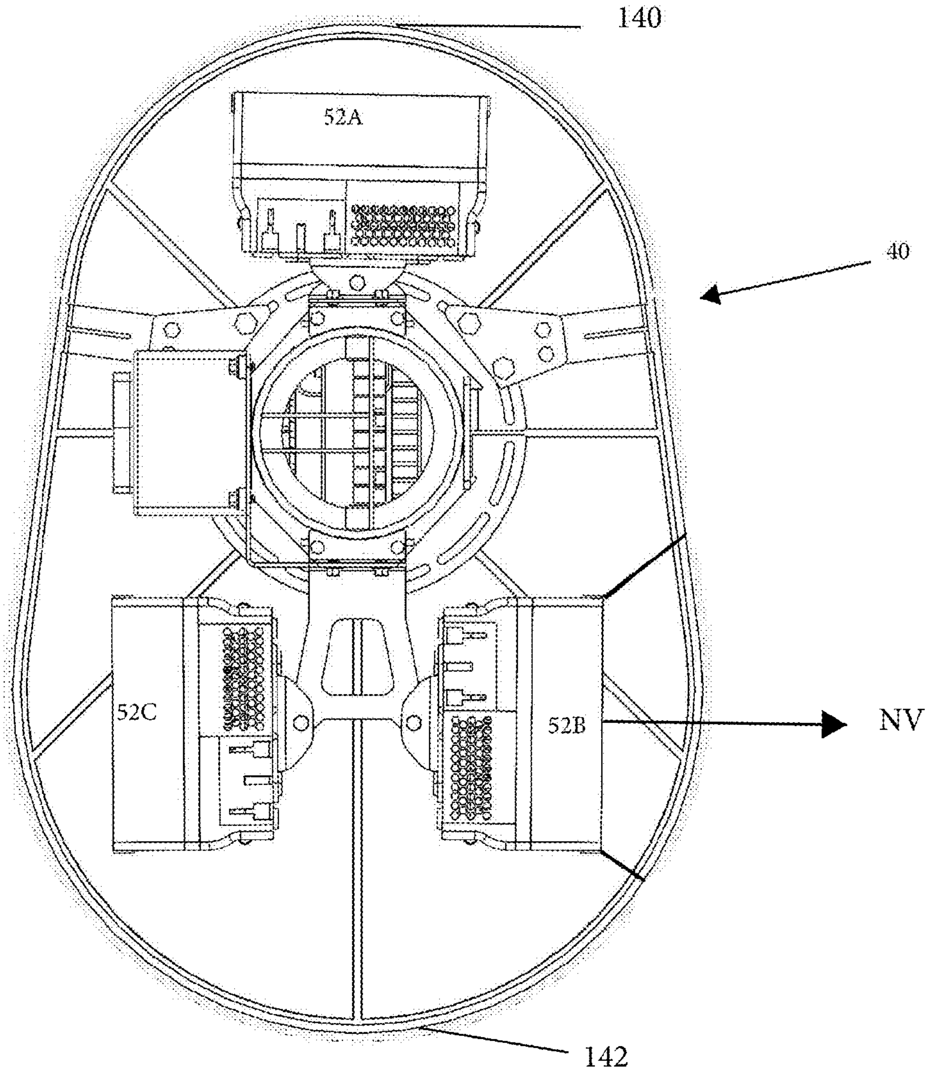

Another feature of the antenna housing is illustrated in FIGS. 8A and 8B, which show a top view of an interior of another embodiment of an antenna bay 40 as defined by a lower divider/panel 60 (e.g., floor of the bay) and a sidewall/shroud 24, through which radios/antennas 52 within the housing emit and/or receive radio frequency (RF waves). As the shroud(s) covers an active surface of the radios, the shroud is typically made of a material that is substantially transparent (e.g., transmission of greater than 90%) to radiofrequency (RF) waves. While being RF transparent, it is still desirable to align a normal of the emitting face (e.g., a normal vector perpendicular to the face of the emitting surface) to be nearly perpendicular with the interior surface of the shroud. That is, it is desirable to maintain an incident angle between the normal vector and an interior surface of the shroud as near to perpendicular as possible to reduce reflection or scatter. In the present embodiment, the ovular shape of the sidewall/shroud allows angular positioning of the antennas over a wider range of angles while maintaining the desired relationship between the emitting face of the radios and the inside surface of the shroud.

It has been recognized that prior antenna housings/bays typically utilize a circular cross-sectional design providing a uniform sidewall and spacing surrounding three equally spaced and angled antennas. In such an arrangement, the emitting faces of each radio/antenna is typically angled 120 degrees from the emitting faces of each adjacent radio/antenna. This works well when utilized in a circular housing. However, the inventors have recognized that utilization of three equally angled antennas for wireless access points in urban environments, especially environments with tall buildings (e.g., urban canyons), often results in one or two of the antennas being primarily directed at a building wall. This results in inefficient use of the antennas. The inventors have found it is desirable to direct one emitting face of one radio/antenna directly into the street and direct the emitting faces of the other two radios/antennas along the sidewalks. In such an arrangement, emitting faces of two radios are positioned 180 degrees from one another and the emitting face of the third radio is perpendicular to other two radios. While possible in some instances to aim the antennas within the prior art circular housings away from nearby buildings, this has often left a normal vector from an emitting surface of an antenna being overly angled (e.g., highly non-perpendicular incident angle) relative to an interior surface of a circular shroud. Such an incident angle between the normal vector of the emitting surface and the interior of the shroud can affect RF emission and RF reception.

The presented antenna housing overcomes the deficiencies of prior generally circular antenna housings by utilizing a housing and shroud having an elongated or generally ovular shape. See FIGS. 8A and 8B. As illustrated, a long axis of the antenna bay (e.g., extending through the central support/spire) is greater in length that the cross-axis of the bay (e.g., extending through the central support/spire perpendicular to the long-axis). Stated otherwise, the bay 40 has a generally ovular shape such that the bay has two rounded ends 140, 142 and two side surfaces. The use of the of an elongated housing allows for moving the center of curvature CC1 and CC2 (See FIG. 8A) of each rounded end (and/or rounded corner) into the interior of the antenna bay rather than in the center of a central support of the housing. This allows mounting the radios/antennas on pivot points that are on or near the center of curvature CC1 and CC2 for the portion of the shroud through which they emit and receive. This allows rotating the emitting surface of each radio along a curved inside surface of the shroud while maintaining a near perpendicular relationship between the normal vector of the emitting surface and the inside surface of the shroud. Accordingly, reflection and/or scatter is reduced. The ovular shape allows two of the antennas to be positioned at 180 degrees to one other without having an emitting surface of the antennas disposed at an incident angle relative to the inside surface of the shroud that may result in undesirable reflection.

As illustrated in FIG. 8A, two of the antennas 52 are mounted in one rounded end 140 of the housing 40 while a single antenna is mounted in the other rounded end 142 of the housing. As illustrated a bracket 130 connects the two antennas in the second rounded end to the support spire 42 such that they are disposed adjacent to the interior surface of the second rounded end at a substantially similar distance as the antenna in the first rounded end. When equally angled to form 120-degree sectors, the emitting surfaces of each of the antenna directly face the inside surface of the housing. Stated otherwise a normal vector NV from each of the radios (only one shown) is substantially perpendicular to the inside surface of the shroud 26.

In urban setting with tall buildings, it may be desirable to aim the antenna 52A in the first end 120 outward toward a street (e.g., roughly perpendicular to the street) while aiming the other two antennas 52B and 52C substantially perpendicular to the first antenna such that they point in two directions along a sidewalk. This is illustrated in FIG. 5B. As each of the two radios 52B and 52C are mounted near the center of curvature of the second end of the housing the normal vector NV remains nearly perpendicular to the inside surface of the housing. See FIG. 8B. In an embodiment, substantially perpendicular means the normal vector remains plus or minus 10 degrees from perpendicular to the inside surface of the housing over a 45 degree range of angular movement of the antenna. In another embodiment, substantially perpendicular means the normal vector remains plus or minus 10 degrees from perpendicular to the inside surface of the housing over a 45 degree range of angular movement of the antenna.

The foregoing description has been presented for purposes of illustration and description. Furthermore, the description is not intended to limit the inventions and/or aspects of the inventions to the forms disclosed herein. Consequently, variations and modifications commensurate with the above teachings, and skill and knowledge of the relevant art, are within the scope of the presented inventions. The embodiments described hereinabove are further intended to explain best modes known of practicing the inventions and to enable others skilled in the art to utilize the inventions in such, or other embodiments and with various modifications required by the particular application(s) or use(s) of the presented inventions. It is intended that the appended claims be construed to include alternative embodiments to the extent permitted by the prior art.

What is claimed is:

1. A wireless antenna housing, comprising:

an elongated support spire, the support spire having a length between an upper end and a lower end and a hollow interior, wherein a long axis of the support spire defines a vertical reference axis;

at least three partition panels attached at spaced locations along the length of the support spire, wherein each partition panel comprises:

a surface that is transverse to the vertical reference axis; and an aperture extending through the surface, wherein the support spire extends though the aperture; and a connector attaching the partition panel to the support spire, wherein the at least three partition panels form a lower partition panel, an intermediate partition panel and an upper partition panel;

a shroud, wherein the shroud extends between the lower partition panel and the upper partition panel and around at least a portion of peripheries of the three partition panels, wherein the three partition panels and the shroud define a first antenna bay and a second antenna bay, wherein the first and second antenna bays are at least partially enclosed, and wherein a sidewall of the support spire includes;

a first opening between the lower partition panel and the intermediate partition panel, wherein the first opening provides a passageway between the hollow interior of the spire and the first antenna bay, and a second opening between the intermediate partition panel and the upper partition panel, wherein the second opening provides a passageway between the hollow interior of the spire and the second antenna bay.

2. The antenna housing of claim 1, further comprising:

a fan configured to displace air through the hollow interior of the support spire and through the first and second openings in the sidewall of the support spire.

3. The antenna housing of claim 1, wherein the hollow interior of the support spire is divided into at least two sections.

4. The antenna housing of claim 1, wherein the partition panels are selectively connectable along the length of the support spire.

5. The antenna housing of claim 4, wherein a first spacing between the lower partition panel and the intermediate partition panel and a second spacing between the intermediate partition panel and the upper partition panel are equal.

6. The antenna housing of claim 4, wherein a first spacing between the lower partition panel and the intermediate partition panel is different than a second spacing between the intermediate partition panel and the upper partition panel.

7. The antenna housing of claim 1, wherein each partition panel is an integrally formed single-piece element, wherein the aperture extends through an interior of the single-piece partition panel.

8. The antenna housing of claim 1, wherein each partition panel comprises:

a first piece; and a second piece, wherein the first piece and second piece connect to define the aperture.

9. The antenna housing of claim 1, wherein each partition panel further comprise:

an upper surface;

a lower surface spaced from the upper surface;

a sidewall surface extending between the upper and lower surface about at least a portion of a periphery of the partition panel; and at least one duct having:

a first end opening through the sidewall surface; and a second end opening through the upper surface or the lower surface.

10. The antenna housing of claim 1, wherein the shroud comprises:

a first shroud extending between the lower partition panel and the intermediate partition panel; and a second shroud extending between the intermediate partition panel and the upper partition panel.

11. The antenna housing of claim 1, wherein the shroud comprises:

at least first and second mating elements, wherein each element has a concave interior surface that faces an interior of the antenna bays.

12. The antenna housing of claim 1, wherein the shroud is formed from a Radio Frequency (RF) transparent material.

13. The antenna housing of claim 1, further comprising:

at least one support strap extending between peripheral edges of the at least three partition panels.

14. The antenna housing of claim 1, further comprising:

three antennas disposed within one of the first and second antenna bays.

15. The antenna housing of claim 14, further comprising:

three vertical dividers disposed between each adjacent pair of the three antennas.

16. The antenna housing of claim 1, wherein each antenna is individually adjustable about an axis that is parallel to the vertical reference axis.

17. The antenna housing of claim 1, wherein the lower end of the support spire is connected to the top of a support pole.

18. The antenna housing of claim 1, further comprising:

at least two intermediate partition panels disposed along the length of the support spire between the lower partition panel and the upper partition panel.

19. The antenna housing of claim 18, further comprising: at least five antenna bays disposed between the lower partition panel and the upper partition panel.

* * * * *